US012266166B2

(12) United States Patent
Fleischman et al.

(10) Patent No.: US 12,266,166 B2
(45) Date of Patent: *Apr. 1, 2025

(54) AUTOMATED SPATIAL INDEXING OF IMAGES TO VIDEO

(71) Applicant: Open Space Labs, Inc., San Francisco, CA (US)

(72) Inventors: Michael Ben Fleischman, San Francisco, CA (US); Philip DeCamp, Boulder, CO (US); Jeevan James Kalanithi, San Francisco, CA (US)

(73) Assignee: Open Space Labs, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/645,235

(22) Filed: Apr. 24, 2024

(65) Prior Publication Data
US 2024/0273893 A1    Aug. 15, 2024

Related U.S. Application Data

(63) Continuation of application No. 18/188,300, filed on Mar. 22, 2023, now Pat. No. 11,995,885, which is a
(Continued)

(51) Int. Cl.
*G06V 20/10* (2022.01)
*G06T 17/00* (2006.01)
(Continued)

(52) U.S. Cl.
CPC .............. *G06V 20/10* (2022.01); *G06T 17/00* (2013.01); *G06T 19/003* (2013.01); *G06V 10/70* (2022.01);
(Continued)

(58) Field of Classification Search
CPC ........ G06V 20/10; G06V 10/70; G06V 20/20; G06V 20/52; G06V 20/64; G06V 20/44;
(Continued)

(56) References Cited

U.S. PATENT DOCUMENTS 6,097,393 A     8/2000 Prouty et al.
7,639,943 B1    12/2009 Kalajan
(Continued)

FOREIGN PATENT DOCUMENTS

CN    101055494 A    10/2007
CN    102084319 A    6/2011
(Continued)

OTHER PUBLICATIONS

Chang, S-F. et al., "A Fully Automated Content-Based Video Search Engine Supporting Spatiotemporal Queries," IEEE Transactions on Circuits and Systems for Video Technology, vol. 8, No. 5, Sep. 1998, pp. 602-615.
(Continued)

*Primary Examiner* — Farzana Hossain
(74) *Attorney, Agent, or Firm* — Fenwick & West LLP

(57) ABSTRACT

A spatial indexing system receives a video that is a sequence of frames depicting an environment, such as a floor of a construction site, and performs a spatial indexing process to automatically identify the spatial locations at which each of the images were captured. The spatial indexing system also generates an immersive model of the environment and provides a visualization interface that allows a user to view each of the images at its corresponding location within the model.

20 Claims, 20 Drawing Sheets

Related U.S. Application Data continuation of application No. 17/501,115, filed on Oct. 14, 2021, now Pat. No. 11,638,001, which is a continuation of application No. 17/151,004, filed on Jan. 15, 2021, now Pat. No. 11,178,386, which is a continuation of application No. 16/680,318, filed on Nov. 11, 2019, now Pat. No. 10,944,959.

(60) Provisional application No. 62/759,945, filed on Nov. 12, 2018.

(51) Int. Cl.
| | |
|---|---|
| G06T 19/00 | (2011.01) |
| G06V 10/70 | (2022.01) |
| G06V 20/20 | (2022.01) |
| G06V 20/40 | (2022.01) |
| G06V 20/52 | (2022.01) |
| G06V 20/64 | (2022.01) |
| H04N 13/279 | (2018.01) |
| H04N 13/282 | (2018.01) |
| H04N 23/62 | (2023.01) |
| H04N 23/63 | (2023.01) |
| H04N 23/661 | (2023.01) |

(52) U.S. Cl.
CPC .............. *G06V 20/20* (2022.01); *G06V 20/52* (2022.01); *G06V 20/64* (2022.01); *H04N 13/279* (2018.05); *H04N 13/282* (2018.05); *H04N 23/62* (2023.01); *H04N 23/631* (2023.01); *H04N 23/661* (2023.01); *G06T 2200/24* (2013.01); *G06T 2210/04* (2013.01); *G06T 2219/004* (2013.01); *G06T 2219/024* (2013.01); *G06V 20/44* (2022.01)

(58) Field of Classification Search
CPC ... G06V 2201/10; G06T 17/00; G06T 19/003; G06T 2200/24; G06T 2210/04; G06T 2219/004; G06T 2219/024; H04N 13/279; H04N 13/282; H04N 23/62; H04N 23/631; H04N 23/661; H04N 23/698
See application file for complete search history.

(56) References Cited

U.S. PATENT DOCUMENTS

| | | | |
|---|---|---|---|
| 8,270,767 | B2 | 9/2012 | Park |
| 8,705,893 | B1 | 4/2014 | Zhang et al. |
| 9,445,081 | B1 | 9/2016 | Kouperman et al. |
| 9,990,760 | B2 | 6/2018 | Perez et al. |
| 10,127,721 | B2 | 11/2018 | Upendran et al. |
| 10,139,985 | B2 | 11/2018 | Mildrew et al. |
| 10,163,271 | B1 | 12/2018 | Powers et al. |
| 10,467,804 | B2 | 11/2019 | Fleischman et al. |
| 10,762,698 | B2 | 9/2020 | Fleischman et al. |
| 10,944,959 | B2 | 3/2021 | Fleischman et al. |
| 11,178,386 | B2 | 11/2021 | Fleischman et al. |
| 2003/0063133 | A1 | 4/2003 | Foote et al. |
| 2006/0221072 | A1 | 10/2006 | Se et al. |
| 2007/0110338 | A1 | 5/2007 | Snavely et al. |
| 2008/0069480 | A1 | 3/2008 | Aarabi et al. |
| 2009/0010493 | A1 | 1/2009 | Gornick et al. |
| 2009/0297118 | A1 | 12/2009 | Fink et al. |
| 2011/0261049 | A1 | 10/2011 | Cardno et al. |
| 2012/0194644 | A1 | 8/2012 | Newcombe et al. |
| 2013/0222583 | A1 | 8/2013 | Earnshaw |
| 2013/0300740 | A1 | 11/2013 | Snyder et al. |
| 2014/0043436 | A1 | 2/2014 | Bell et al. |
| 2014/0288890 | A1 | 9/2014 | Khainson et al. |
| 2014/0320661 | A1 | 10/2014 | Sankar et al. |
| 2015/0248916 | A1 | 9/2015 | Kopf et al. |
| 2015/0287241 | A1 | 10/2015 | Huston et al. |
| 2015/0347846 | A1 | 12/2015 | Guzmán-Rivera et al. |
| 2016/0035094 | A1 | 2/2016 | Kennedy et al. |
| 2016/0148433 | A1 | 5/2016 | Petrovskaya et al. |
| 2016/0305785 | A1 | 10/2016 | Nishijima et al. |
| 2016/0350906 | A1 | 12/2016 | Meier |
| 2017/0018086 | A1 | 1/2017 | Zhang |
| 2017/0094165 | A1 | 3/2017 | Meadow et al. |
| 2017/0176191 | A1 | 6/2017 | Li et al. |
| 2018/0075168 | A1 | 3/2018 | Tiwari et al. |
| 2018/0143023 | A1 | 5/2018 | Bjorke et al. |
| 2018/0341811 | A1 | 11/2018 | Bendale et al. |
| 2018/0374276 | A1 | 12/2018 | Powers et al. |
| 2019/0020817 | A1* | 1/2019 | Shan ................... H04N 23/698 |
| 2019/0026958 | A1 | 1/2019 | Gausebeck et al. |

FOREIGN PATENT DOCUMENTS

| | | |
|---|---|---|
| CN | 105989063 A | 10/2016 |
| GB | 201804082 | 4/2018 |
| WO | WO 2019/175286 A1 | 9/2019 |

OTHER PUBLICATIONS

De Las Heras, L-P. et al., "Statistical segmentation and structural recognition for floor plan interpretation," IJDAR, vol. 17, Dec. 3, 2013, pp. 221-237.

European Patent Office, Extended European Search Report and Opinion, EP Patent Application No. 18823793.7, dated Jun. 10, 2021, eight pages.

European Patent Office, Extended European Search Report and Opinion, EP Patent Application No. 19884142.1, Jul. 5, 2022, 8 pages.

Lukosch, S. et al. "Providing Information on the Spot: Using Augmented Reality for Situational Awareness in the Security Domain," Computer Supported Cooperative Work, vol. 24, No. 6, Oct. 6, 2015, pp. 591-642.

PCT International Search Report and Written Opinion, PCT Application No. PCT/US18/40123, dated Sep. 6, 2018, 14 pages.

PCT International Search Report and Written Opinion, PCT Application No. PCT/US2019/060784, dated Jan. 31, 2020, 15 pages.

Snavely, N. et al., "Photo Tourism: Exploring Photo Collections in 3D," SIGGRAPH Conference Proceedings, vol. 25, No. 3, Jan. 1, 2006, pp. 835-846.

Stückler, J. et al. "Semantic mapping using object-class segmentation of RGB-D images," IEEE/RSJ International Conference on Intelligent Robots and Systems, Oct. 7, 2012, pp. 3005-3010.

United States Office Action, U.S. Appl. No. 16/022,477, Jan. 30, 2019, 16 pages.

United States Office Action, U.S. Appl. No. 16/022,477, May 24, 2019, 21 pages.

United States Office Action, U.S. Appl. No. 16/585,625, Oct. 31, 2019, 19 pages.

United States Office Action, U.S. Appl. No. 16/680,318, Sep. 30, 2020, 6 pages.

United States Office Action, U.S. Appl. No. 16/940,253, May 13, 2021, 21 pages.

United States Office Action, U.S. Appl. No. 17/151,004, Aug. 4, 2021, 8 pages.

United States Office Action, U.S. Appl. No. 17/501,115, Dec. 21, 2022, 15 pages.

United States Office Action, U.S. Appl. No. 17/827,789, Aug. 29, 2023, 35 pages.

United States Office Action, U.S. Appl. No. 17/827,789, Dec. 7, 2023, 19 pages.

United States Office Action, U.S. Appl. No. 17/827,789, Mar. 24, 2023, 34 pages.

Xiao, J. et al. "Multiple view semantic segmentation for street view images," IEEE 12th International Conference on Computer Vision, Sep. 29, 2009, pp. 686-693.

United States Office Action, U.S. Appl. No. 18/188,300, Nov. 15, 2023, 10 pages.

United States Office Action, U.S. Appl. No. 18/188,300, Aug. 3, 2023, 20 pages.

(56) References Cited

OTHER PUBLICATIONS

China National Intellectual Property Administration, Office Action, Chinese Patent Application No. 201980088554.2, Jun. 28, 2024, 19 pages.
European Patent Office, Examination Report and Written Opinion, European Patent Application No. 19884142.1, Apr. 17, 2024, 10 pages.
Moghadam, P. et al. "SAGE: Semantic annotation of georeferenced environments," *Journal of Intelligent & Robotic Systems*, vol. 83, Sep. 2016, pp. 635-648.
Vidas, S. et al. "3D thermal mapping of building interiors using an RGB-D and thermal camera," *IEEE international conference on robotics and automation*, May 6, 2013, pp. 2311-2318.
Zhang, Y. et al. "Walk&sketch: create floor plans with an RGB-D camera," *ACM Conference on Ubiquitous Computing*, Sep. 5, 2012, pp. 461-470.
European Patent Office, Examination Report, European Patent Application No. 18823793.7, Jan. 8, 2025, 10 pages.

\* cited by examiner

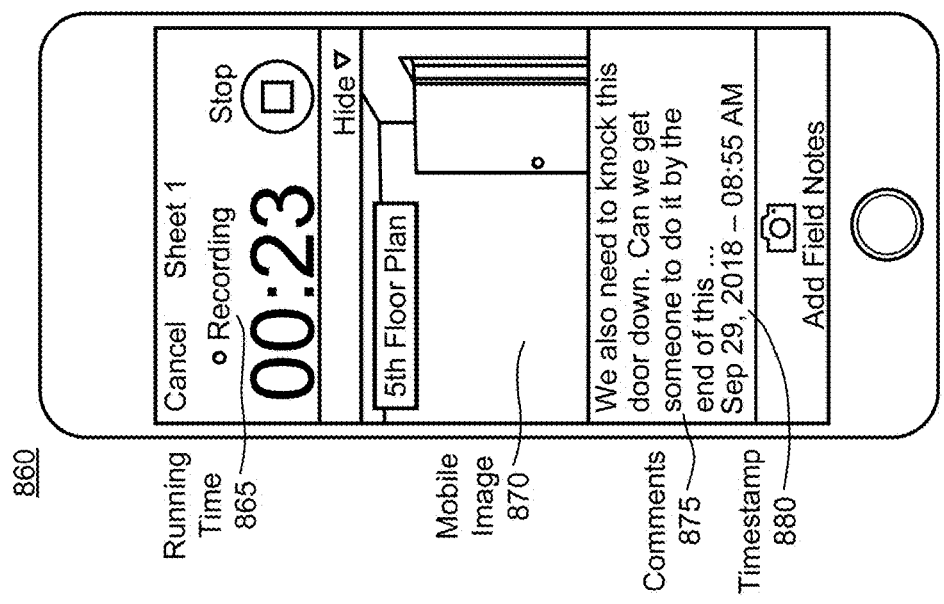
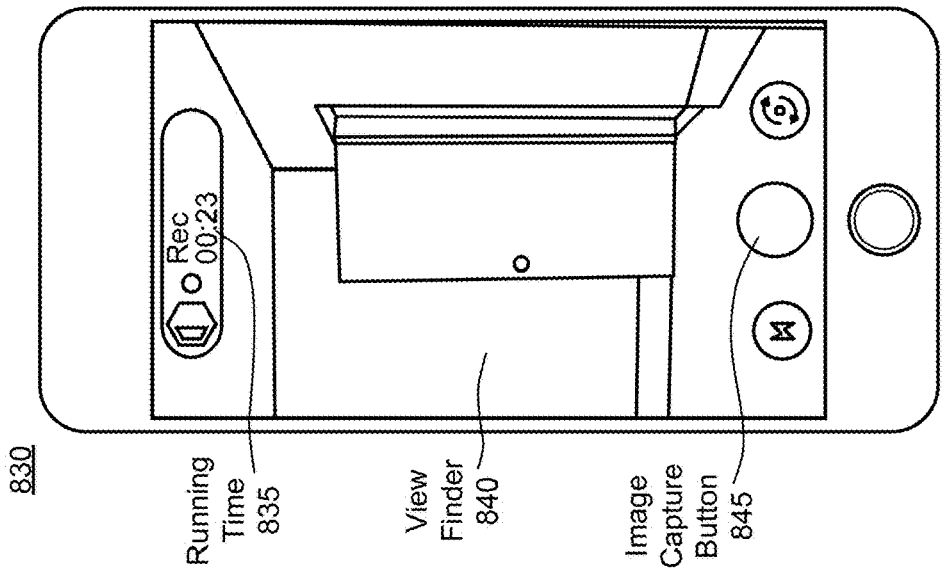
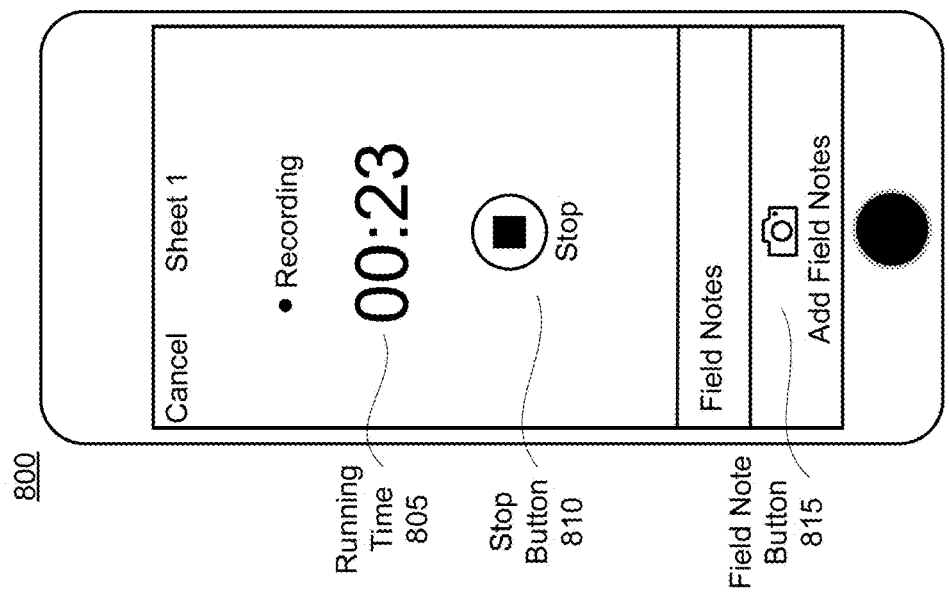

AUTOMATED SPATIAL INDEXING OF IMAGES TO VIDEO

CROSS REFERENCE TO RELATED APPLICATIONS

This application is a continuation of U.S. application Ser. No. 18/188,300, filed Mar. 22, 2023, now U.S. Pat. No. 11,995,885, which is a continuation of U.S. application Ser. No. 17/501,115, filed Oct. 14, 2021, now U.S. Pat. No. 11,638,001, which is a continuation of U.S. application Ser. No. 17/151,004, filed Jan. 15, 2021, now U.S. Pat. No. 11,178,386, which is continuation of U.S. application Ser. No. 16/680,318, filed Nov. 11, 2019, now U.S. Pat. No. 10,944,959, which application claims the benefit of U.S. Provisional Application Ser. No. 62/759,945 filed Nov. 12, 2018, all of which are incorporated herein in their entirety by this reference.

TECHNICAL FIELD

This disclosure relates to image and video processing, and particularly to spatial indexing of images captured with one camera to video frames captured with a second camera.

BACKGROUND

Location-tagged photography has a wide variety of uses in indoor spaces. For example, a realtor may wish to create a virtual tour of a house by capturing a series of 360-degree photographs of the rooms in a house and tagging each photograph with its position within the house. Similarly, a general contractor may wish monitor progress on a construction site by capturing and adding location tags to 360-degree photographs of the construction site.

Conventionally, when a user captures multiple pictures of an indoor space, the user must manually annotate each image with its location within the space. Requiring the user to manually add location tags to each image can be inefficient and time-consuming. Moreover, a general contractor may want to take photographs of specific areas of concern while simultaneously capturing a video of the site. Manually integrating photographs with the video would be inefficient and time consuming.

SUMMARY

A spatial indexing system receives a video that is a sequence of frames depicting an environment and performs a spatial indexing process to automatically identify the spatial locations at which each of the frames were captured. The frames are captured by a video capture system as the video capture system is moved through the environment along a camera path. In one embodiment, the spatial indexing system performs a simultaneous localization and mapping (SLAM) algorithm on the frames to estimate the camera path and generate a model of the environment. The camera path estimate that is generated with the SLAM algorithm can optionally be combined with motion data, location data, or a floorplan of the environment to generate a combined estimate of the camera path. The spatial indexing system can then determine the location at which each of the frames was captured and provide a visualization interface that provides an immersive view of each of the frames at its corresponding location within the model of the environment.

The spatial indexing system further allows a user to capture images from a mobile client device that is separate from the video capture system. The spatial indexing system determines the location at which each image is taken and inserts the images into the corresponding location in the visualization interface. The location of each image can be determined based on one or more of the calculated camera path, image timestamps, frame timestamps, and image metadata.

The automated spatial indexing process can be performed without requiring the user to manually annotate each frame or image with its location. This is particularly advantageous in situations where a large number of frames and/or images are captured at once or where frames of the same space are captured at regular time intervals (e.g., every couple of days) in order to monitor changes within the space over a period of time.

BRIEF DESCRIPTION OF THE DRAWINGS

FIG. 8A-8C are example field note interfaces on client devices, according to one embodiment.

DETAILED DESCRIPTION

I. Overview

Figure 1A:
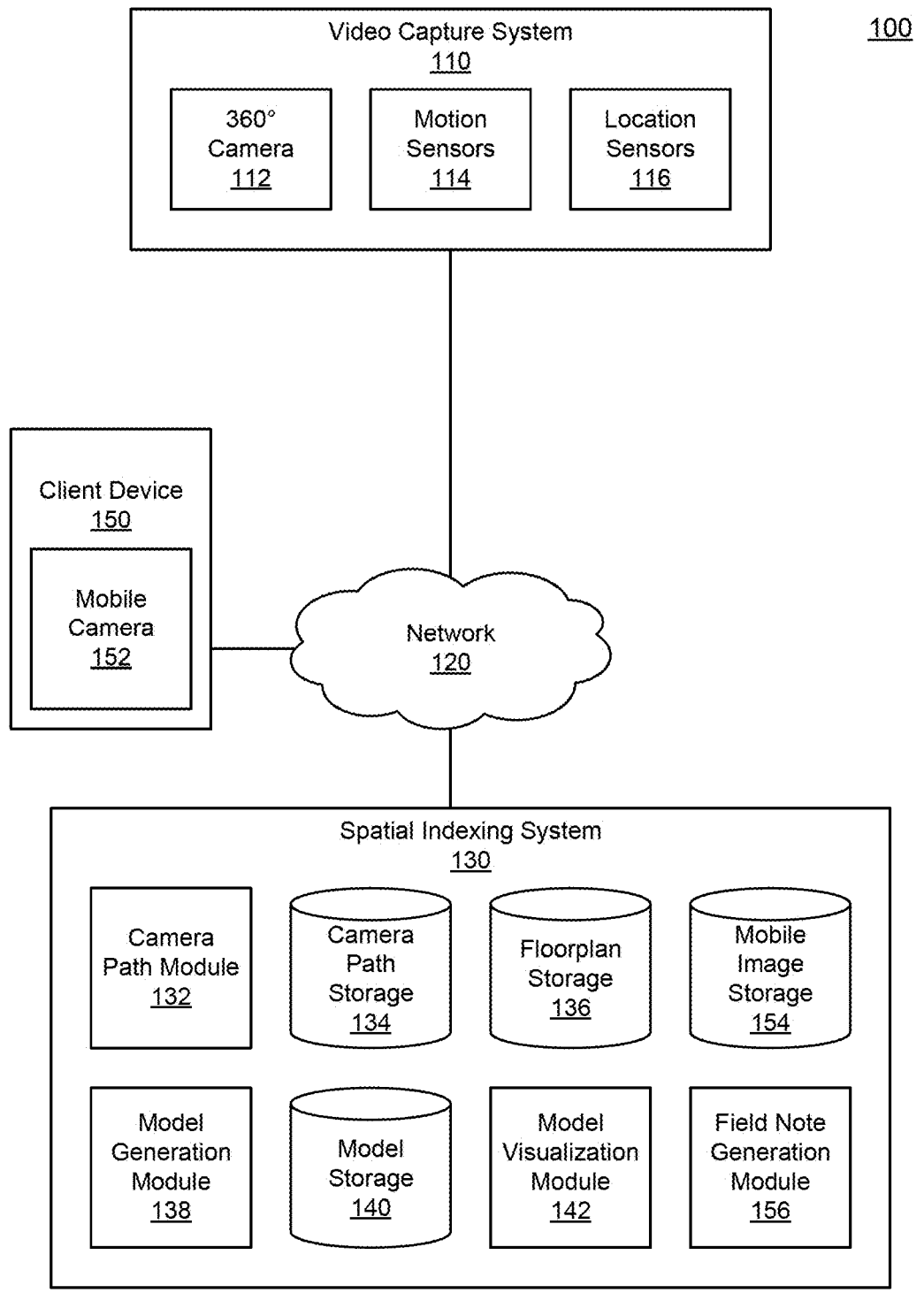
FIG. 1A illustrates a system environment for a spatial indexing system, according to one embodiment.

A spatial indexing system receives a video that is a sequence of frames depicting an environment, such as a floor of a construction site, and performs a spatial indexing process to automatically identify the spatial locations at which each of the frames were captured. The spatial indexing system additionally receives one or more images from a mobile device. The spatial indexing system also generates an immersive model of the environment and provides a visualization interface that allows a user to view each of the frames and images at its corresponding location within the immersive model. This enables the user to quickly navigate to a specific frame and/or image by selecting the location at which the frame was recorded.

In some cases, spatial indexing is performed by recording location data generated by a GPS receiver and location tagging each frame as the frame is captured. Another option is to use an indoor positioning system (IPS) that generates location data based on signals received from transmitters placed at known locations in the environment. For example, an IPS receiver may generate location data based on RF fingerprints transmitted by multiple radio frequency (RF) transmitters that are placed throughout the environment. However, these approaches become unreliable in environments where GPS signals are substantially attenuated or where an indoor positioning system not available. For example, in indoor environments, interference from structural elements such as steel beams can substantially attenuate GPS signals and drastically reduce the accuracy of locations generated by a GPS. As another example, an indoor positioning system is often not available in active construction sites often due to cost and robustness issues. In such environments, the user would ordinarily have to manually annotate each captured frame with its location, which can be time-consuming and inefficient.

Rather than having the user manually annotate the captured frames with their locations, the spatial indexing process can instead determine the locations of the frames by applying a simultaneous localization and mapping (SLAM) algorithm to the video that is a sequence of frames. The SLAM algorithm estimates a six-dimensional (6D) camera pose (i.e., a 3D translation and a 3D rotation) for each of the frames. This sequence of 6D camera poses is represented within the immersive model of the environment. In one embodiment, the visualization interface displays the immersive model of the environment as both a 2D map and a first-person view. Each frame is represented on the 2D map as an icon at the location at which the frame was captured. The user can select an icon to display the frame that was captured at the corresponding location. The first-person view displays an immersive view of a single 360-degree frame that the user can pan and zoom. The first-person view can also include waypoint icons representing the relative locations of other frames in the immersive model, and the user can select a waypoint icon to display a first-person view of the frame captured at the corresponding location.

The video that is a sequence of frames is captured by a video capture system as it is moved through the environment along a camera path. For example, the environment may be a floor of a building that is under construction, and the video that is a sequence of frames is captured as a construction worker walks through the floor with the video capture system mounted on the worker's helmet. Because the spatial indexing system can automatically identify the positions at which each of the frames is captured, the construction worker does not need to walk through the floor along a predetermined path; instead, the construction worker can simply walk through the floor along any arbitrary camera path, which allows the worker to walk around any obstructions that he encounters.

Continuing with the construction site example above, suppose a general contractor from a general contracting company wishes to record the progress of construction over the course of an 18-month project to build a residential high-rise building. Such progress records are useful, for example, in tracking subcontractor progress, resolving conflicts between plans and as-built construction, and as evidence in liability claims that may occur after a project is completed. Critically, the value of such progress records is entirely dependent upon the ability of end users within the general contracting company to efficiently find video/frame data about specific locations within the construction site.

Conventionally, generating such progress records requires an employee or subcontractor of the general contracting company to walk through the construction site recording frames (or video) and manually annotating the locations within the construction site that appear in each frame. Such annotations enable efficient access to the frames of specific locations within the construction site, but the time and cost associated with manually generating these annotations can be prohibitive, and these costs scale with the size of the site and the frequency of recording.

Using the methods and systems described herein, the spatial indexing system can automatically index the location of every captured frame without having a user perform any manual annotation and without having to rely solely on GPS or RF signals, which can be absent, blocked, or significantly attenuated in an indoor environment such as a construction site. This reduces the amount of user input associated with capturing the frames, which allows the process to be completed faster and more efficiently.

After indexing the location of every captured frame, the spatial indexing system can generate an immersive model of the environment. The immersive model includes a set of frames extracted from the sequence of captured frames and specifies a location on the floorplan for each of the extracted frames. The immersive model can also include one or more route vectors for each extracted frame. A route vector for an extracted frame specifies a spatial distance (i.e., a direction and a magnitude) between the extracted frame and one of the other extracted frames. When displaying one of the extracted frames in the visualization interface, the spatial indexing system can display waypoint icons within the extracted frame at the positions defined by each of the route vectors. The user can then select one of these waypoint icons to view the extracted frame that was captured at that position.

Although the drawings and written description provide examples with respect to a construction site, the methods and systems described herein can also be used to in other types of environments, such as an interior area of a completed building, an interior area of some other type of structure (such as a ship), or an outdoor area (such as a garden or yard). In addition to the construction site example described herein, the captured frames and the resulting immersive model can also be used in a variety of other contexts. For instance, a security guard can use the methods and systems described herein to record the state of a facility at each checkpoint along a route. As another example, a facilities manager can capture photo documentation of the inventory in a warehouse. As still another example, a realtor can capture photos to create a virtual tour of a house.

II. System Environment

FIG. 1A illustrates a system environment 100 for identifying spatial locations at which frames in a sequence were captured, according to one embodiment. In the embodiment shown in FIG. 1A, the system environment 100 includes a video capture system 110, a network 120, a spatial indexing system 130, and a client device 150. Although a single video capture system 110 and a single client device 150 are shown in FIG. 1A, in some implementations the spatial indexing system interacts with multiple video capture systems 110 or multiple client devices 150 at once.

The video capture system 110 collects frame data, motion data, and location data as the system 110 is moved along a camera path. In the embodiment shown in FIG. 1A, the video capture system includes a 360-degree camera 112, motion sensors 114, and location sensors 116. The video capture system 110 is implemented as a device with a form factor that is suitable for being moved along the camera path. In one embodiment, the video capture system 110 is a portable device that a user physically moves along the camera path, such as a wheeled cart or a device that is mounted on or integrated into an object that is worn on the user's body (e.g., a backpack or hardhat). In another embodiment, the video capture system 110 is mounted on or integrated into a vehicle. The vehicle may be, for example, a wheeled vehicle (e.g., a wheeled robot) or an aircraft (e.g., a quadcopter drone), and can be configured to autonomously travel along a preconfigured route or be controlled by a human user in real-time.

The 360-degree camera 112 collects frame data by capturing a sequence of 360-degree frames as the video capture system 110 is moved along the camera path. As referred to herein, a 360-degree frame is an frame having a field of view that covers a 360-degree field of view. The 360-degree camera 112 can be implemented by arranging multiple 360-degree cameras in the video capture system 110 so that they are pointed at varying angles relative to each other, and configuring the 360-degree cameras to capture frames of the environment from their respective angles at approximately the same time. The frames can then be combined to form a single 360-degree frame. For example, the 360-degree camera 112 can be implemented by capturing frames at substantially the same time from two 180° panoramic cameras that are pointed in opposite directions.

The frame data captured by the video capture system 110 may further include frame timestamps. The frame timestamps are data corresponding to the time at which each frame was captured by the video capture system 110. As used herein, frames are captured at substantially the same time if they are captured within a threshold time interval of each other (e.g., within 1 second, within 100 milliseconds, etc.).

In one embodiment, the 360-degree camera 112 captures a 360-degree video, and the frames in the sequences of frames are the frames of the video. In another embodiment, the 360-degree camera 112 captures a sequence of still frames separated by fixed time intervals. The video that is a sequence of frames can be captured at any frame rate, such as a high frame rate (e.g., 60 frames per second) or a low frame rate (e.g., 1 frame per second). In general, capturing the video that is a sequence of frames at a higher frame rate produces more robust results, while capturing the video that is a sequence of frames at a lower frame rate allows for reduced data storage and transmission. The motion sensors 114 and location sensors 116 collect motion data and location data, respectively, while the 360-degree camera 112 is capturing the frame data. The motion sensors 114 can include, for example, an accelerometer and a gyroscope. The motion sensors 114 can also include a magnetometer that measures a direction of a magnetic field surrounding the video capture system 110.

The location sensors 116 can include a receiver for a global navigation satellite system (e.g., a GPS receiver) that determines the latitude and longitude coordinates of the video capture system 110. In some embodiments, the location sensors 116 additionally or alternatively include a receiver for an indoor positioning system (IPS) that determines the position of the video capture system based on signals received from transmitters placed at known locations in the environment. For example, multiple radio frequency (RF) transmitters that transmit RF fingerprints are placed throughout the environment, and the location sensors 116 also include a receiver that detects RF fingerprints and estimates the location of the video capture system 110 within the environment based on the relative intensities of the RF fingerprints.

Although the video capture system 110 shown in FIG. 1A includes a 360-degree camera 112, motion sensors 114, and location sensors 116, some of the components 112, 114, 116 may be omitted from the video capture system 110 in other embodiments. For instance, one or both of the motion sensors 114 and the location sensors 116 may be omitted from the video capture system. In addition, although the video capture system 110 is described in FIG. 1A with a 360-degree camera 112, the video capture system 110 may alternatively include a camera with a narrow field of view.

In some embodiments, the video capture system 110 is implemented as part of a computing device (e.g., the computer system 900 shown in FIG. 9) that also includes a storage device to store the captured data and a communication interface that sends the captured data over the network 120 to the spatial indexing system 130. In one embodiment, the video capture system 110 stores the captured data locally as the system 110 is moved along the camera path, and the data is sent to the spatial indexing system 130 after the data collection has been completed. In another embodiment, the video capture system 110 sends the captured data to the spatial indexing system 130 in real-time as the system 110 is being moved along the camera path.

The video capture system 110 communicates with other systems over the network 120. The network 120 may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). The network 120 may also be used to deliver push notifications through various push notification services, such as APPLE Push Notification Service (APNs) and GOOGLE Cloud Messaging (GCM). Data exchanged over the network 110 may be represented using any suitable format, such as hypertext markup language (HTML), extensible markup language (XML), or JavaScript object notation (JSON). In some embodiments, all or some of the communication links of the network 120 may be encrypted using any suitable technique or techniques.

The client device 150 is any mobile computing device such as a smartphone, tablet computer, laptop computer that has a mobile camera 152 and can connect to the network 120. The mobile camera 152 captures 152 images, particularly still two-dimensional images. Each of the images captured has an associated image timestamp. The client device 150 can send the images captured by the mobile camera 152 to the spatial indexing system 130. For use cases that involve merely viewing and interacting with the visualization interface (discussed in the next paragraph), the client device 150 may also be a non-mobile computing device such as a desktop computer.

The spatial indexing system 130 receives the frames and the other data collected by the video capture system 110 as well as the images and other data collected by the client device 150, performs a spatial indexing process to automatically identify the spatial locations at which each of the frames and images were captured, builds a model of the environment, and provides a visualization interface that allows the client device 150 to view the captured frames and images at their respective locations within the model. In the embodiment shown in FIG. 1A, the spatial indexing system 130 includes a camera path module 132, camera path storage 134, floorplan storage 136, a model generation module 138, model storage 140, a model visualization module 142, a mobile image storage 154, and a field note generation module 156.

The camera path module 132 receives the frames and the other data that were collected by the video capture system 110 as the system 110 was moved along the camera path and determines the camera path based on the received frames and data. In one embodiment, the camera path is defined as a 6D camera pose for each frame in the video that is a sequence of frames. The 6D camera pose for each frame is an estimate of the relative position and orientation of the 360-degree camera 112 when the frame was captured. The camera path module 132 can store the camera path in the camera path storage 134.

In one embodiment, the camera path module 132 uses a SLAM (simultaneous localization and mapping) algorithm to simultaneously (1) determine an estimate of the camera path by inferring the location and orientation of the 360-degree camera 112 and (2) model the environment using direct methods or using landmark features (such as oriented FAST and rotated BRIEF (ORB), scale-invariant feature transform (SIFT), speeded up robust features (SURF), etc.) extracted from the video that is a sequence of frames. The camera path module 132 outputs a vector of six dimensional (6D) camera poses over time, with one 6D vector (three dimensions for location, three dimensions for orientation) for each frame in the sequence, and the 6D vector can be stored in the camera path storage 134. An embodiment of the camera path module 132 is described in detail below with respect to FIG. 2A.

The spatial indexing system 130 can also include floorplan storage 136, which stores one or more floorplans, such as those of environments captured by the video capture system 110. As referred to herein, a floorplan is a to-scale, two-dimensional (2D) diagrammatic representation of an environment (e.g., a portion of a building or structure) from a top-down perspective. The floorplan specifies the positions and dimensions of physical features in the environment, such as doors, windows, walls, and stairs. The different portions of a building or structure may be represented by separate floorplans. For example, in the construction example described above, the spatial indexing system 130 may store separate floorplans for each floor, unit, or substructure.

The model generation module 136 generates an immersive model of the environment. As referred to herein, the immersive model is a representation of the environment that comprises a set of extracted frames of the environment, the relative positions of each of the frames (as indicated by the frame's 6D pose), and (optionally) the absolute position of each of the frames on a floorplan of the environment. In one embodiment, the model generation module 136 receives a frame sequence and its corresponding camera path (e.g., a 6D pose vector specifying a 6D pose for each frame in the video that is a sequence of frames) from the camera path module 132 or the camera path storage 134 and extracts a subset of the frames in the sequence and their corresponding 6D poses for inclusion in the model. For example, if the video that is a sequence of frames are frames in a video that was captured at 30 frames per second, the model generation module 136 subsamples the frames by extracting frames and their corresponding 6D poses at 0.5-second intervals. After generating the model, the model generation module 136 can store the model in the model storage 140. An embodiment of the model generation module 136 is described in detail below with respect to FIG. 2B.

The model visualization module 142 provides a visualization interface to the client device 150. The visualization interface allows the user to view the immersive model in two ways. First, the visualization interface provides a 2D overhead map interface based on the output of the model generation module 138. The 2D overhead map is an interactive interface in which each relative camera location indicated on the 2D map is interactive, such that clicking on a point on the map navigates to the extracted frame that was captured at that point in space. Second, the visualization interface provides a first-person view of an extracted 360-degree frame that allows the user to pan and zoom around the frame and to navigate to other frames by selecting waypoint icons within the frame that represent the relative locations of the other frames. The visualization interface provides the first-person view of an frame after the user selects the frame in the 2D overhead map or in the first-person view of a different frame. Example screenshots of the visualization interface are shown in FIGS. 3A-3G.

The client device 150 displays, on a display device such as a screen, the visualization interface to a user and receives user inputs to interact with the visualization interface. An example implementation of the client device 150 for viewing the visualization interface is described below with reference to the computer system 900 in FIG. 9.

The mobile image storage 154 stores images taken by the client device 150 and sent to the spatial indexing system 130 via the network 120. The field note generation module 156 uses images from the mobile image store 154 to generate field notes. Field notes are annotations placed within the immersive model. In some embodiments, the field notes comprise images associated with a camera path that can be displayed within the visualization interface. Field notes may also include related information such as text, timestamps, camera orientation and other information. In some embodiments, the field notes are integrated into the immersive model by comparing image timestamps and frame timestamps, as described in greater detail in relation to FIG. 2C. Metadata tags may also be used to integrate the images into the immersive model, as described in greater detail in relation to FIG. 2C. Computer vision techniques may also be used to detect objects within video frames to integrate the images into the immersive model. As an example, computer vision techniques may be used to identify a mobile camera taking pictures within the 360-degree frames and may assign the images with the location data extracted from those frames. An embodiment of the field note generation module 156 is described in detail below with respect to FIG. 2B.

III. Frame and Image Capture Process

Figure 1B:
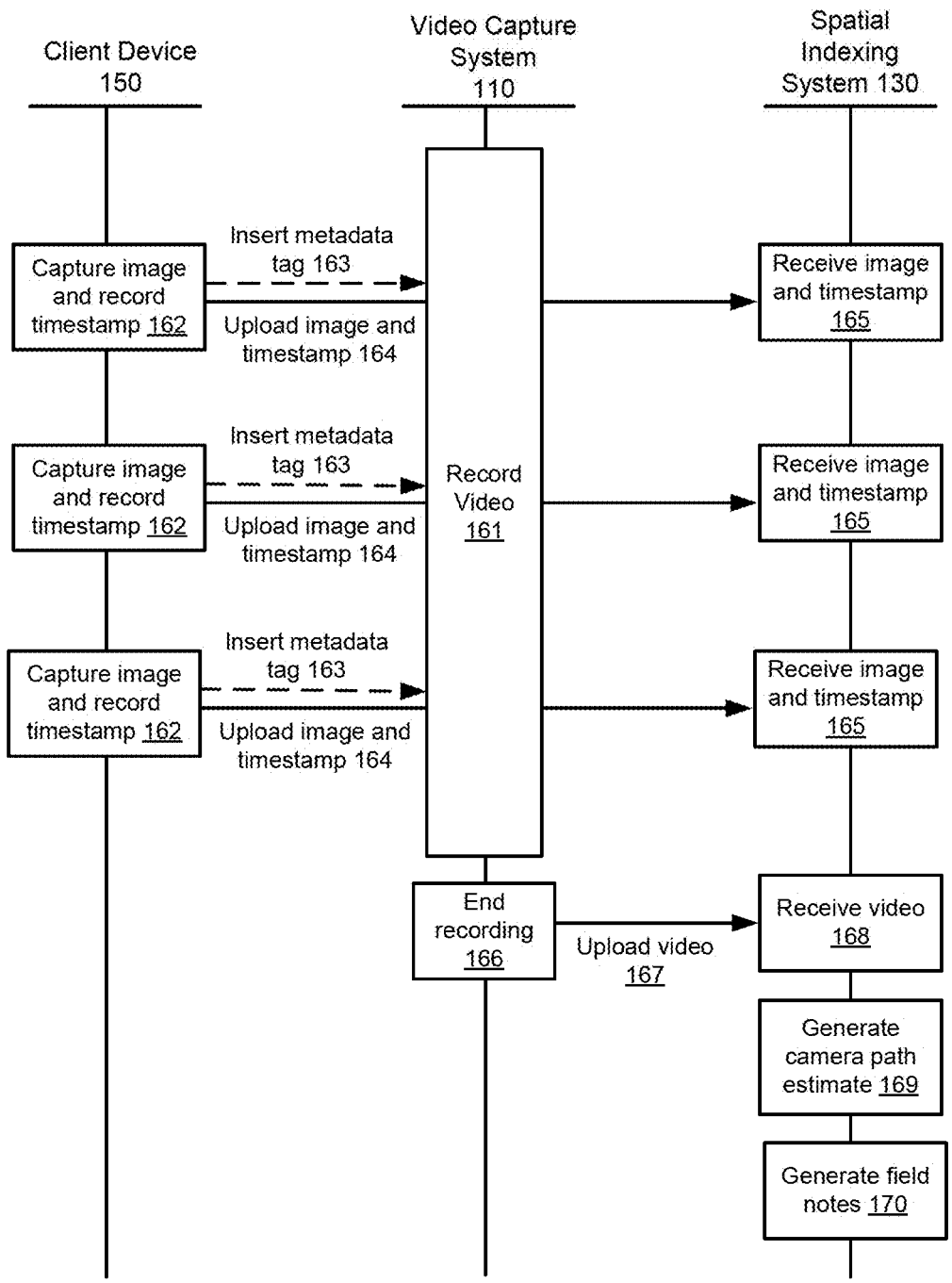
FIG. 1B illustrates a sequence diagram of the spatial indexing system, a client device, and a video capture system, according to one embodiment.

FIG. 1B illustrates a sequence diagram of the spatial indexing system 130, the client device 150, and the video capture system 110, according to one embodiment. In the embodiment shown in FIG. 1B, the video capture system 110 records video 161. Recording the video 161 may be continuous, as shown in FIG. 1B, or may be segmented and paused at times. While the video capture system 110 is recording the video 161, the video capture system is also capturing other data, such as timestamps and/or motion and location data as disclosed in relation to FIG. 1A. The video capture system 110 may record video 161 in the format of 360-degree frames.

During the process of recording video by the video capture system, the client device 150 captures an image and records its timestamp 162. That is, a timestamp of the image captured by the client device would have a timestamp that is the same or similar to 360-degree frames being simultaneously captured by the video capture system 110. The capture of an image and recording of its timestamp 162 may occur once or may have multiple occurrences, as shown in FIG. 1B. The capture of the image and timestamp may be manually performed by the human user, or the capture may be automated, for example at periodic intervals. Often, the same individual will both be wearing a helmet attached to the video capture system 110 and holding device 150 for image capture, however, video and image capture may be performed by separate individuals traversing largely the same camera path. Each image captured has a recorded timestamp. Multiple images may be captured in rapid succession and have the same timestamp.

In some embodiments, the client device 150 sends a signal to the video capture system 110 to insert a metadata tag 163 into the video. The insertion of the metadata tag 163 may occur while the video is concurrently being recorded or while the video recording is paused. The metadata tag is inserted into the data structure containing the sequence of frames. For example, if the video is being recorded in the .mp4 format, the video capture system 110 makes available an API containing a function for metadata insertion, which the mobile device 150 uses to insert the image timestamp and associated image tag/identifier (e.g., a unique image number) as metadata.

The client device 150 uploads the image and timestamp 164 to the spatial indexing system 130. The upload 164 may also take place immediately after the capture of the image and recording of the timestamp 163 or after multiple images have been captured and the corresponding timestamps recorded 163. Images and timestamps may be uploaded one-by-one, as shown in FIG. 1B, or may be done by uploading multiple images and corresponding timestamps at once. For example, multiple images and corresponding timestamps can be uploaded 164 to the spatial indexing system 130 at a later time, such as after an end of recording 166. The client device 150 uploads 164 to the spatial indexing system 130 via the network 140.

The spatial indexing system 130 receives an image and a timestamp corresponding to the image 165. As disclosed in relation to the upload of the images and the corresponding timestamps, the receiving 165 may occur as single images and timestamps or as multiple images and timestamps. Additionally, the receiving 165 can occur when the image and timestamp are captured 162, or at a later time. Every image and corresponding timestamp uploaded 164 by the client device 150 is received 165 by the spatial indexing system 130.

The steps of capturing an image and recording its timestamp 162, optionally inserting a metadata tag 163, and uploading the image and timestamp 164 can be repeated by the mobile device 150 multiple times while the video capture system 110 is recording video 161. The client device 150 may also permit capture 162 and upload 164 of images and timestamps before or after recording begins or ends 166. Additionally, the spatial indexing system 130 may not necessarily receive some or all of the images and timestamps 165 until after recording has ended 166.

After the end of recording 166, the video capture system 110 uploads the video 167 to the spatial indexing system 130. The spatial indexing system 130 then receives the video 168. The spatial indexing system 130 may receive the video 168 before it receives one or more images and timestamps 165 and it is also possible for the video capture system 110 to upload the video 167 before one or more of the images and timestamps are uploaded 164 by the client device 150.

After receiving the video 168, the spatial indexing system 130 generates a camera path estimate 169. The generation of the camera path estimate is done by the camera path module 132 of the spatial indexing system 130, as shown in FIG. 1A. The camera path module 132 is discussed in more detail in relation to FIG. 2A below.

The spatial indexing system 130 generates field notes 170. The received images and timestamps as well as the generated camera path module are used to generate field notes 170. The generation of field notes 170 is done by the field note generation module 156 of the spatial indexing system 130, as shown in FIG. 1A. The field note generation module 156 is described in greater detail in relation to FIG. 2C below.

IV. Camera Path Generation Overview

Figure 2A:
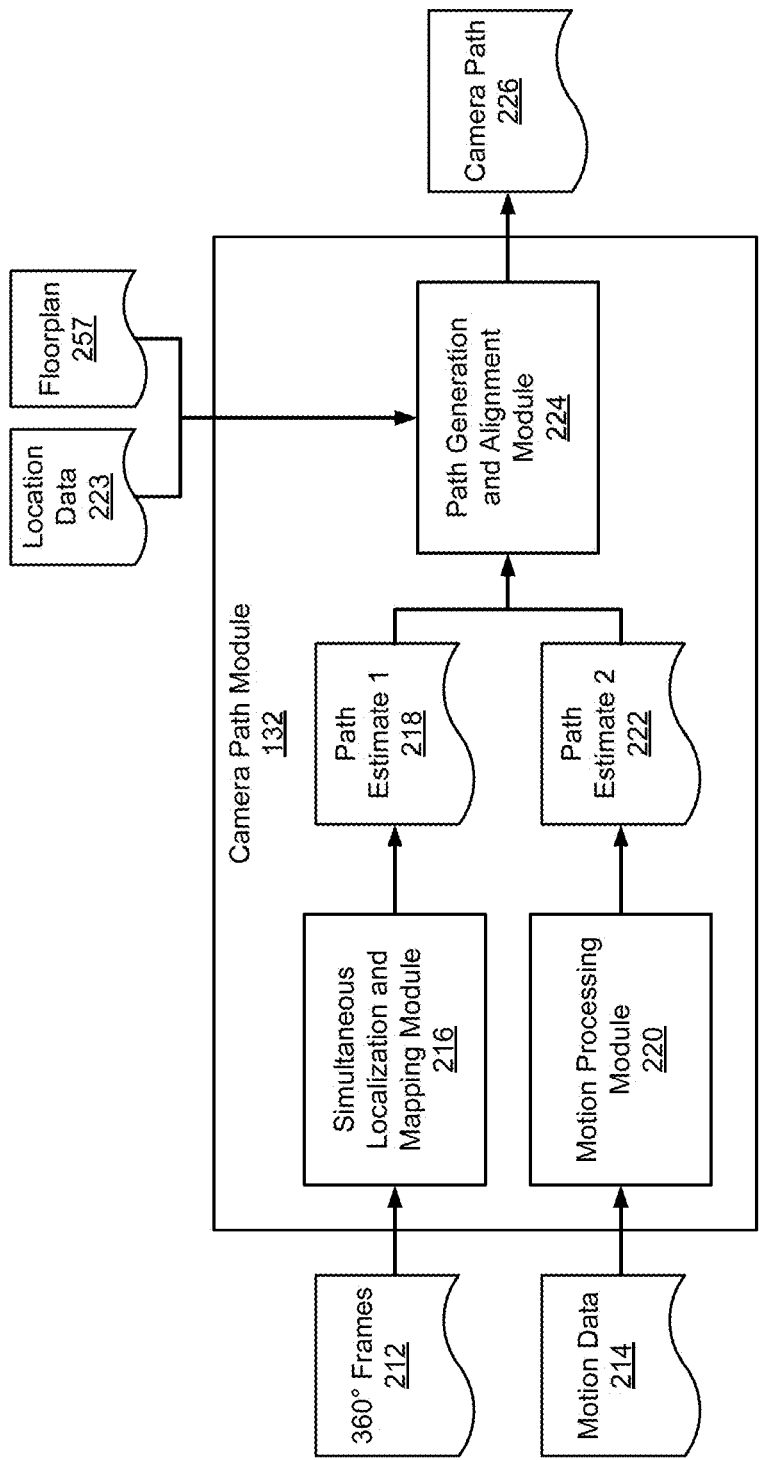
FIG. 2A illustrates a block diagram of a camera path module, according to one embodiment.

FIG. 2A illustrates a block diagram of the camera path module 132 of the spatial indexing system 130 shown in FIG. 1A, according to one embodiment. The camera path module 132 receives input data (e.g., a sequence of 360-degree frames 212, motion data 214, and location data 223) captured by the video capture system 110 and generates a camera path 226. In the embodiment shown in FIG. 2A, the camera path module 132 includes a simultaneous localization and mapping (SLAM) module 216, a motion processing module 220, and a path generation and alignment module 224.

The SLAM module 216 receives the sequence of 360-degree frames 212 and performs a SLAM algorithm to generate a first estimate 218 of the camera path. The sequence of 360-degree frames may be the video recorded 161 by the video capture system 110 in FIG. 1B. Before performing the SLAM algorithm, the SLAM module 216 can perform one or more preprocessing steps on the frames 212. In one embodiment, the pre-processing steps include extracting features from the frames 212 by converting the sequence of 360-degree frames 212 into a sequence of vectors, where each vector is a feature representation of a respective frame. In particular, the SLAM module can extract SIFT features, SURF features, or ORB features.

After extracting the features, the pre-processing steps can also include a segmentation process. The segmentation process divides the video that is a sequence of frames into segments based on the quality of the features in each of the frames. In one embodiment, the feature quality in a frame is defined as the number of features that were extracted from the frame. In this embodiment, the segmentation step classifies each frame as having high feature quality or low feature quality based on whether the feature quality of the frame is above or below a threshold value, respectively (i.e., frames having a feature quality above the threshold are classified as high quality, and frames having a feature quality below the threshold are classified as low quality). Low feature quality can be caused by, e.g., excess motion blur or low lighting conditions.

After classifying the frames, the segmentation process splits the sequence so that consecutive frames with high feature quality are joined into segments and frames with low feature quality are not included in any of the segments. For example, suppose the camera path travels into and out of a series of well-lit rooms along a poorly-lit hallway. In this example, the frames captured in each room are likely to have high feature quality, while the frames captured in the hallway are likely to have low feature quality. As a result, the segmentation process divides the video that is a sequence of frames so that each sequence of consecutive frames captured in the same room is split into a single segment (resulting in a separate segment for each room), while the frames captured in the hallway are not included in any of the segments.

After the pre-processing steps, the SLAM module 216 performs a SLAM algorithm to generate a first estimate 218 of the camera path. In one embodiment, the first estimate 218 is also a vector of 6D camera poses over time, with one 6D vector for each frame in the sequence. In an embodiment where the pre-processing steps include segmenting the video that is a sequence of frames, the SLAM algorithm is performed separately on each of the segments to generate a camera path segment for each segment of frames.

The motion processing module 220 receives the motion data 214 that was collected as the video capture system 110 was moved along the camera path and generates a second estimate 222 of the camera path. Similar to the first estimate 218 of the camera path, the second estimate 222 can also be represented as a 6D vector of camera poses over time. In one embodiment, the motion data 214 includes acceleration and gyroscope data collected by an accelerometer and gyroscope, respectively, and the motion processing module 220 generates the second estimate 222 by performing a dead reckoning process on the motion data. In an embodiment where the motion data 214 also includes data from a magnetometer, the magnetometer data may be used in addition to or in place of the gyroscope data to determine changes to the orientation of the video capture system 110.

The data generated by many consumer-grade gyroscopes includes a time-varying bias (also referred to as drift) that can impact the accuracy of the second estimate 222 of the camera path if the bias is not corrected. In an embodiment where the motion data 214 includes all three types of data described above (accelerometer, gyroscope, and magnetometer data), and the motion processing module 220 can use the accelerometer and magnetometer data to detect and correct for this bias in the gyroscope data. In particular, the motion processing module 220 determines the direction of the gravity vector from the accelerometer data (which will typically point in the direction of gravity) and uses the gravity vector to estimate two dimensions of tilt of the video capture system 110. Meanwhile, the magnetometer data is used to estimate the heading bias of the gyroscope. Because magnetometer data can be noisy, particularly when used inside a building whose internal structure includes steel beams, the motion processing module 220 can compute and use a rolling average of the magnetometer data to estimate the heading bias. In various embodiments, the rolling average may be computed over a time window of 1 minute, 5 minutes, 10 minutes, or some other period.

The path generation and alignment module 224 combines the first estimate 218 and the second estimate 222 of the camera path into a combined estimate of the camera path 226. In an embodiment where the video capture system 110 also collects location data 223 while being moved along the camera path, the path generation module 224 can also use the location data 223 when generating the camera path 226. If a floorplan of the environment is available, the path generation and alignment module 224 can also receive the floorplan 257 as input and align the combined estimate of the camera path 216 to the floorplan 257. Example techniques for combining the first estimate 218 and the second estimate 222 and aligning the camera path to a floorplan are described below with respect to FIGS. 4, 5, and 6.

V. Model Generation Overview

Figure 2B:
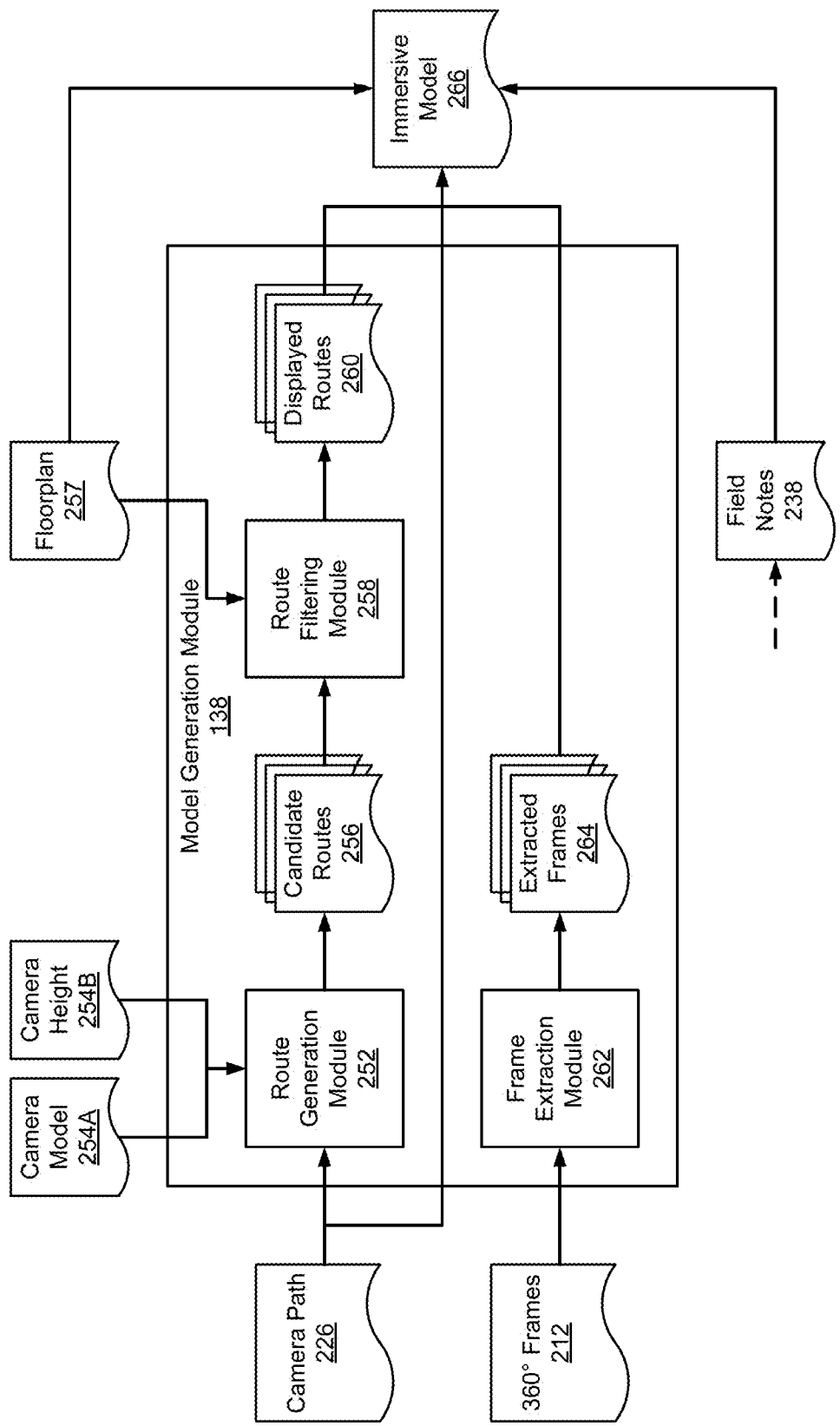
FIG. 2B illustrates a block diagram of a model generation module, according to one embodiment.

FIG. 2B illustrates a block diagram of the model generation module 138 of the spatial indexing system 130 shown in FIG. 1A, according to one embodiment. The model generation module 138 receives the camera path 226 generated by the camera path module 132, along with the sequence of 360-degree frames 212 that were captured by the video capture system 110, a floorplan 257 of the environment, and information about the 360-degree camera 254. The output of the model generation module 138 is an immersive model 266 of the environment. In the illustrated embodiment, the model generation module 138 includes a route generation module 252, a route filtering module 258, and a frame extraction module 262.

The route generation module 252 receives the camera path 226 and 360-degree camera information 254 and generates one or more candidate route vectors 256 for each extracted frame. The 360-degree camera information 254 includes a camera model 254A and camera height 254B. The camera model 254A is a model that maps each 2D point in a 360-degree frame (i.e., as defined by a pair of coordinates identifying a pixel within the frame) to a 3D ray that represents the direction of the line of sight from the 360-degree camera to that 2D point. In one embodiment, the spatial indexing system 130 stores a separate camera model for each type of camera supported by the system 130. The camera height 254B is the height of the 360-degree camera relative to the floor of the environment while the video that is a sequence of frames is being captured. In one embodiment, the 360-degree camera height is assumed to have a constant value during the frame capture process. For instance, if the 360-degree camera is mounted on a hardhat that is worn on a user's body, then the height has a constant value equal to the sum of the user's height and the height of the 360-degree camera relative to the top of the user's head (both quantities can be received as user input).

As referred to herein, a route vector for an extracted frame is a vector representing a spatial distance between the extracted frame and one of the other extracted frames. For instance, the route vector associated with an extracted frame has its tail at that extracted frame and its head at the other extracted frame, such that adding the route vector to the spatial location of its associated frame yields the spatial location of the other extracted frame. In one embodiment, the route vector is computed by performing vector subtraction to calculate a difference between the three-dimensional locations of the two extracted frames, as indicated by their respective 6D pose vectors.

Referring to the model visualization module 142, the route vectors for an extracted frame are later used after the model visualization module 142 receives the immersive model 266 and displays a first-person view of the extracted frame. When displaying the first-person view, the model visualization module 142 renders a waypoint icon (shown in FIG. 3B as a blue circle) at a position in the frame that represents the position of the other frame (e.g., the frame at the head of the route vector). In one embodiment, the model visualization module 140 uses the following equation to determine the position within the frame at which to render the waypoint icon corresponding to a route vector:

$$P_{icon} = M_{proj} * (M_{view})^{-1} * M_{delta} * G_{ring}.$$

In this equation, $M_{proj}$ is a projection matrix containing the parameters of the 360-degree camera projection function used for rendering, $M_{view}$ is an isometry matrix representing the user's position and orientation relative to his or her current frame, $M_{delta}$ is the route vector, $G_{ring}$ is the geometry (a list of 3D coordinates) representing a mesh model of the waypoint icon being rendered, and $P_{icon}$ is the geometry of the icon within the first-person view of the frame.

Referring again to the route generation module 138, the route generation module 252 can compute a candidate route vector 256 between each pair of extracted frames. However, displaying a separate waypoint icon for each candidate route vector associated with an frame can result in a large number of waypoint icons (e.g., several dozen) being displayed in an frame, which can overwhelm the user and make it difficult to discern between individual waypoint icons.

To avoid displaying too many waypoint icons, the route filtering module 258 receives the candidate route vectors 256 and selects a subset of the route vectors to be displayed route vectors 260 that are represented in the first-person view with corresponding waypoint icons. The route filtering module 256 can select the displayed route vectors 256 based on a variety of criteria. For example, the candidate route vectors 256 can be filtered based on distance (e.g., only route vectors having a length less than a threshold length are selected).

In some embodiments, the route filtering module 256 also receives a floorplan 257 of the environment and also filters the candidate route vectors 256 based on features in the floorplan. In one embodiment, the route filtering module 256 uses the features in the floorplan to remove any candidate route vectors 256 that pass through a wall, which results in a set of displayed route vectors 260 that only point to positions that are visible in the frame. This can be done, for example, by extracting an frame patch of the floorplan from the region of the floorplan surrounding a candidate route vector 256, and submitting the frame patch to an frame classifier (e.g., a feed-forward, deep convolutional neural network) to determine whether a wall is present within the patch. If a wall is present within the patch, then the candidate route vector 256 passes through a wall and is not selected as one of the displayed route vectors 260. If a wall is not present, then the candidate route vector does not pass through a wall and may be selected as one of the displayed route vectors 260 subject to any other selection criteria (such as distance) that the module 258 accounts for.

The frame extraction module 262 receives the sequence of 360-degree frames and extracts some or all of the frames to generate extracted frames 264. In one embodiment, the sequences of 360-degree frames are captured as frames of a 360-degree video, and the frame extraction module 262 generates a separate extracted frame of each frame. As described above with respect to FIG. 1A, the frame extraction module 262 can also extract a subset of the video that is a sequence of frames 212. For example, if the video that is a sequence of frames 212 was captured at a relatively high framerate (e.g., 30 or 60 frames per second), the frame extraction module 262 can extract a subset of the frames at regular intervals (e.g., two frames per second of video) so that a more manageable number of extracted frames 264 are displayed to the user as part of the immersive model.

The floorplan 257, displayed route vectors 260, camera path 226, and extracted frames 264 are combined into the immersive model 266. As noted above, the immersive model 266 is a representation of the environment that comprises a set of extracted frames 264 of the environment, the relative positions of each of the frames (as indicated by the 6D poses in the camera path 226). In the embodiment shown in FIG. 2B, the immersive model also includes the floorplan 257, the absolute positions of each of the frames on the floorplan, and displayed route vectors 260 for some or all of the extracted frames 264.

Field notes 238 are also integrated into the immersive model 266. Generation of field notes 238 is discussed in the following section in reference to FIG. 2C.

VI. Field Note Generation Overview

Figure 2C:
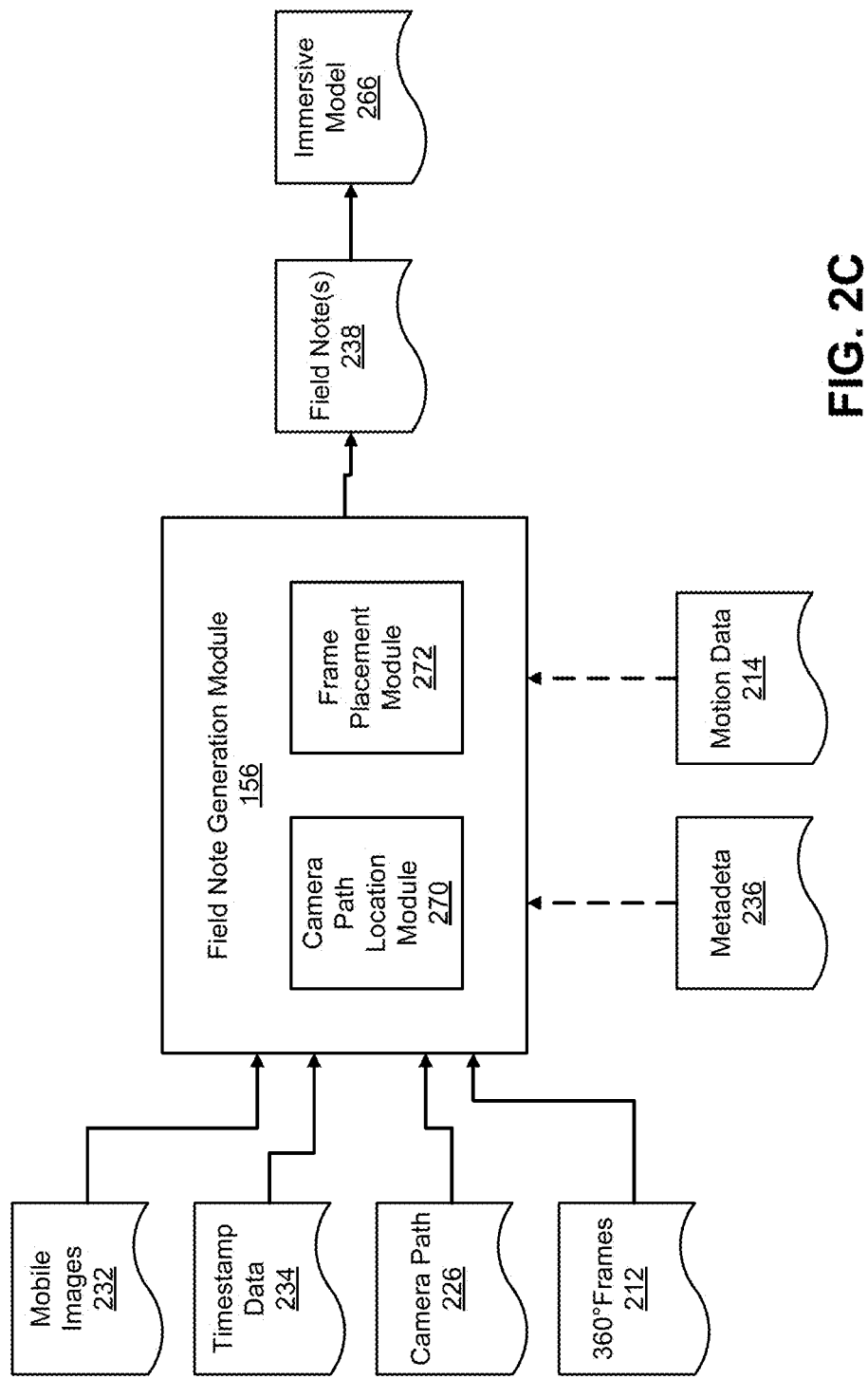
FIG. 2C illustrates a block diagram of a field note generation module, according to one embodiment.

FIG. 2C illustrates a block diagram of a field note generation module 156 shown in FIG. 1A, according to one embodiment. The field note generation module 156 receives inputs including mobile images 232, timestamp data 234, a camera path 226, the 360-degree frames 212, and, in some embodiments, metadata 236 and the motion data 214. The mobile images 232 are those taken by the mobile camera 152 on the client device 150 and stored in the mobile image storage 154, as shown in FIG. 1A. The timestamp data 234 includes timestamps of the mobile images 232 captured by the mobile camera 152. In some embodiments, the timestamp data 234 also includes timestamps of the 360-degree frames 212 captured by the video capture system 110. The metadata 236 are tags included in the sequence of 360-degree frames 212 and are an optional input to the field note generation module 156. For example, the metadata 236 may be the metadata tags inserted 163 in the video recording 161 of FIG. 1B. The camera path 226 is output by the camera path module 132, such as in the embodiment described in FIG. 2A.

The field note generation module 156 outputs one or more field notes 238. Field notes 238 are annotations placed within the immersive model 266, which may include text, mobile image, timestamp data, camera orientation, or other information of relevance. Field notes 238 are placed at specific location within the immersive model 266. That is, a field note 238 has a location along the camera path 226, as determined by a camera path location module 270 within the field note generation module 156. Additionally, the field note 238 has a specific placement within the 360-degree frame 212, as determined by a frame placement module 272 within the field note generation module 156. That is, a field note 238 generally does not take up an entire 360-degree frame, but is instead located at a particular orientation in the field of view within the 360-degree frame. Hence, when the camera path location module 270 determines the location of the field notes 238 along the camera path, the frame placement module 272 determines the specific placement of the field note 238 within the field of view of the 360-degree frame(s) at the location along the camera path. In some embodiments, the frame placement module 272 is optional.

In one embodiment of the camera path location module 270, an analysis of the timestamp data 234 is used to determine the location of the field notes 238 along the camera path 226. For a mobile image from the mobile images 232, a corresponding mobile image timestamp is compared against a set of 360-degree frame timestamps. In one embodiment, the difference between the mobile image timestamp is computed against one or more of the 360-degree frame timestamps, and the 360-degree frame timestamp with the smallest difference is identified as the 360-degree frame to which the field note should be annotated. The camera path location module 270 determines the location of the identified 360-degree frame in the camera path 226 (e.g., an index of the 360-degree frame in the sequence of 360-degree frames 212). A field note 238 associated with the mobile image 232 will appear in the immersive model 266 at the location of the identified 360-degree frame along the camera path 226.

As an example, a user is walking through a construction site. The user is wearing the video capture system 110 on a helmet-mounted system. The user is also carrying a client device 150 in the form of a mobile phone, which the user uses to capture a mobile image 232. The video capture system 110 captures 360-degree frames 212 as the user moves through the construction site. Based on the data captured by the video capture system 110, the camera path module 132 produces a camera path 226. Since the user is wearing the video capture system 110 and holding the client device 150, the camera path is traveled by both the video capture system 110 and the client device 150. Hence by mapping the image timestamp of the mobile image 232 captured by the client device 150 to the 360-degree frame timestamp to which it is closest, the location of a field note 238 corresponding to the image 232 is determined.

In many instances, the user will pause walking through the construction site to capture an image with a client device 150. The pause in the camera path 226, resulting in many frames collected in a similar location over an unusually long span of time, may additionally be used alongside frame timestamp data 234 to match the mobile image 232 to its corresponding location and produce a field note 238. In these instances, the frame timestamps of the frames captured during the pause in motion may all be similar to the image timestamp. However, there is generally a delay in the time between when the user stops to capture the image and when the image is actually captured. These two effects can offset each other.

Hence, in a further embodiment, the camera path location module 270 identifies the location of the field note 238 based on any of a group of frames identified as associated with the pause in motion of the user during image capture, not necessarily the frame timestamp closest in time to the image timestamp. That is, the camera path location module 270 may use the motion data 214 associated with the 360-degree frames 212 to identify a pause in motion of the user. Additionally or alternatively, a pause may be identified using computer vision if several 360-degree frames 212 are overlapping in location (or are below a threshold distance apart) along the camera path 226. If a timestamp of the mobile image 232 is within a threshold time difference as the timestamp(s) of the 360-degree frames 212 at the identified pause, the location of the pause (e.g., one or more of the frames within the pause) is identified by the camera path location module 270 as the location of the field note 238.

In one embodiment, the camera path location module 270 applies computer vision techniques to determine the physical location of the generated field notes 238 along the camera path 226. As an example, this may include performing object recognition on the sequence of 360-degree frames 212 to extract specific objects that are indicative of where (location) and/or when (time) the image was captured. In particular, object recognition can identify the presence of a mobile device 150 in one or more 360-degree frames 212. An inference is made that the device 150 is elevated within the frame because the user is using the device 150 to capture one of the mobile images 232. From the frame or set of frames in which the mobile device 150 is identified, the camera path location module 270 determines the location of capture along the camera path 226.

Further, the computer vision can also be implemented by the frame placement module 272 to determine the specific placement within the 360-degree frame field of view at which the field note belongs. Object recognition identifies the presence (e.g., location along the camera path) of an object and the placement of the object within a frame. The identified placement identifies a direction in which the mobile device 150 is pointed to capture the image in the frame corresponding to the time of capture. The direction of the mobile device 150 is used by the frame placement module 272 to determine the specific placement of the generated field note 238 within the 360-degree frame. The location and the specific placement of the generated field note 238 is used to integrate the field note 238 into the immersive model 266.

The specific computer vision techniques used by the field note generation module 156 (e.g., the camera path location module 270 and the frame placement module 272) may vary by implementation. As an example, techniques such as convolutional neural networks (CNN) (or neural networks more generally), decision trees (boosted, random forest, etc.), and maximum entropy classifiers may be used to analyze frames to identify objects of interest (e.g., phones present in 360-degree frames). Generally, these computer vision techniques are supervised learning techniques that involve training a model's features (or weights or critical values, the name may change depending on the technique) on a set of labeled training data. For example, the labeled training data may identify which of a set of training data frames include in the field of view a user's mobile phone and which do not. Once trained, such a computer vision model may be used to identify the presence, absence, size, and/or location of such objects in the frames. The training data set for such a model may be obtained by obtaining images relevant to the context—for example, a video of 360-degree frames of construction workers holding up phones to take pictures within a working environment while capturing the video.

Some computer vision techniques act on the frames themselves, such as CNNs which are frequently used in the computer vision field of art. As an example, a CNN may be used to identify bounding boxes of the location and size of objects in a frame/image, and such techniques could be used to detect the presence and location of a mobile phone 150 in a 360-degree frame. Other computer vision techniques act on properties (or features) extracted from frames/images. For example, ORB, SIFT, or SURF features are features that involve running, respectively, ORB, SIFT, and SURF algorithms on frames to extract the respective features. These features may be input into a model (e.g., a decision tree, a maximum entropy classifier) to determine, similarly, the presence/absence of an object and/or a size/location of the object.

In another embodiment, metadata 236 is also used by the camera path location module 270 to identify the location of the generated field notes 238 along the camera path 226. When the mobile camera 152 of the client device 150 takes the mobile image 232, the client device 150 provides to the video capture system 110 an instruction to insert metadata 236 regarding the image capture into the video, as described in greater detail in relation to FIG. 1B. Upon receipt of the instruction from the client device 150, the video capture system 110 inserts metadata 236 into the sequence of 360-frames 212. Subsequently, when the camera path location module 270 analyzes inputs to determine the location where the field note belongs, the camera path location module 270 will reference the location of the metadata 232. This metadata tag serves as a reference mark of the approximate location of the user, and therefore also the client device 150 and video capture system 110 when the user captured the mobile image 232. In some embodiments, the metadata 232 analysis may be in addition to or a check on the previously discussed timestamp analysis, or used to narrow a window of search within the sequence of 360-degree frames 212. In other embodiments, the metadata analysis may be a stand-alone method of determining the field note location along the camera path 226. The analysis of the metadata 236 by the camera path location module 270 improves the accuracy of the determined location of the field note 238.

As introduced above, field notes 238 output by the field note generation module 156 are an annotation that associates an image to a location. The location may be a specific time and/or place along the camera path. Field notes 238 may also incorporate comments or other data related to the annotated image and its assigned location. For example, the user may remark what is captured within the image. The field notes 238 can subsequently be incorporated in the immersive model 266. The field notes 238 are displayed in their determined location along the camera path and specific location within the field of view in the immersive model 266 and are visually distinctive from the background. In one embodiment, the field notes 238 are displayed in the immersive model 266 as tags the user may interact with (e.g., by touch input or mouse click). The visualization of the field note 238 expands to display the originally captured mobile image 232 and any other information incorporated in the field note 238. Examples of the incorporation of the field notes 238 into the immersive model 266 are described in greater detail by FIGS. 3F-3G, 7A-7B, and 8A-8C.

VII. Visualization Interface—Examples

FIGS. 3A-3G are screenshots illustrating portions of the model visualization interface provided by the model visualization module, according to one embodiment. As described above in FIG. 1A, the model visualization interface allows a user to view each of the captured frames at its corresponding location within a virtual model of the environment.

The screenshots shown in FIGS. 3A-3G continue with the general contracting company example from above. As framing is being completed on a construction site, the general contractor captures a video that is a sequence of frames inside each unit to create a record of work that will soon be hidden by the installation of drywall. The captured frames are provided as input to the camera path module 132, which generates a vector of 6D camera poses (one 6D pose for each frame). The 6D camera poses are provided as input to the model visualization module, which provides a 2D representation of the relative camera locations associated with each frame.

The user can view this representation by using a client device 150 to view the visualization interface provided by the model visualization module 142, and the user can navigate to different frames in the sequence by selecting icons on a 2D overhead view map. After the user has selected the icon for a frame in the 2D overhead map, the visualization interface displays a first-person view of the frame that the user can pan and zoom. Within this view of the frame, any field notes at that corresponding location can be viewed by selecting the field note.

There are several methods for determining where within the frame 212 of the immersive model 266 the field notes 238 are placed. As previously discussed in reference to FIG. 2C, computer vision analysis can be used to identify a mobile device 150 within the frame, determine the direction the mobile device is directed, and use the direction to determine where in the frame the field note should be placed. As another way to determine field note placement, if the video capture system 110 is mounted in a fixed manner relative to the user's head (e.g. on a hardhat) the location of the field note can be inferred relative to the direction of the camera path. For example, assuming the camera 152 was mounted to capture facing forwards, the direction of the camera path will generally corresponds to the direction the user's head was pointed at the time of image capture, and therefore would also corresponds to the direction the mobile camera 150 was pointed. Consequently, in this example the field note can be places in the center of the frame that corresponds to the head forward direction within the 360-degree frame.

As another example, the spatial indexing system 130 may receive position, rotation, and/or orientation data from an inertial measurement unit (IMU) within the mobile device. This information may indicate that the mobile camera 150 was positioned, rotated, and/or oriented off axis from the direction the video capture system 110 was facing at the timestamp of image capture (or in close proximity in time). The relative difference between these two axes may be used to more accurately determine where the field note is located within the 360-degree capture frame.

The above methods for placing the field note are described as alternatives for sake of clarity of description, and may be combined in various embodiments.

Figure 3A:
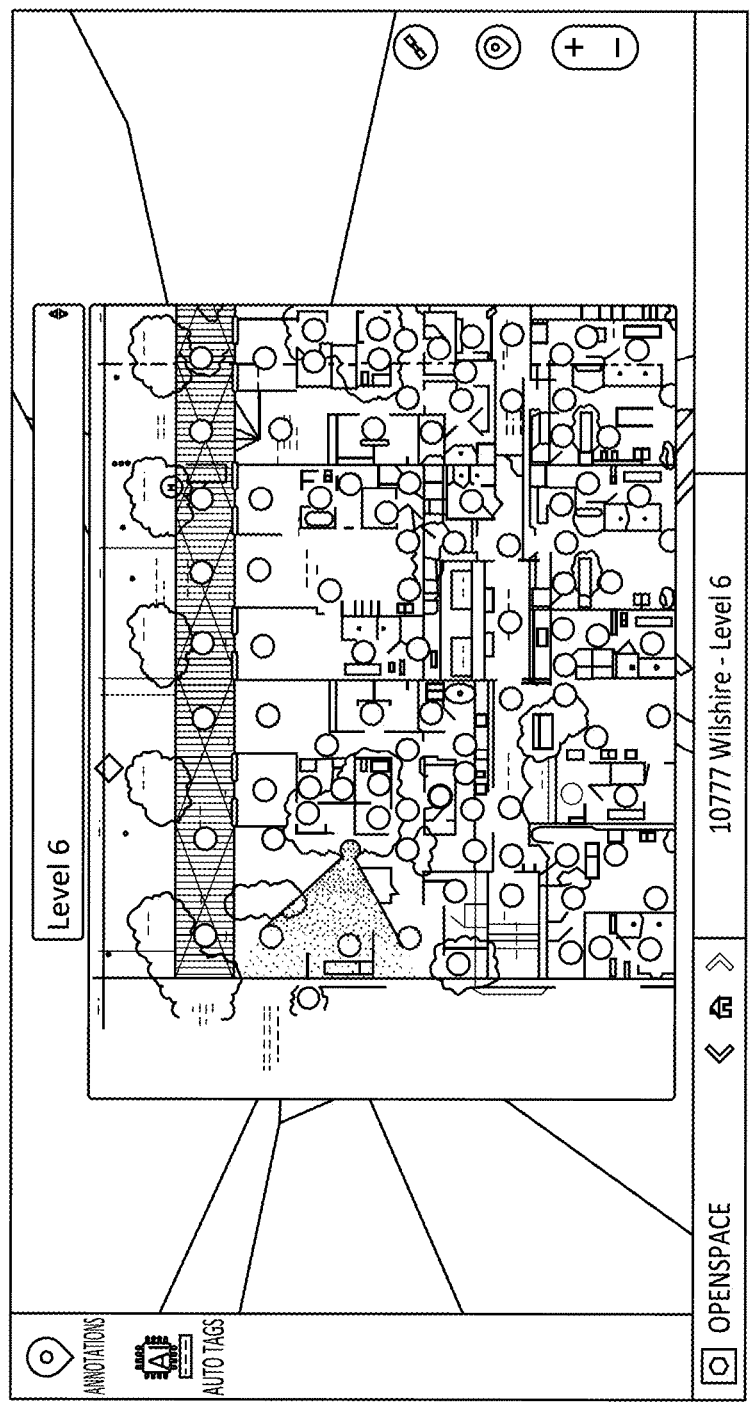
FIGS. 3A-3G are screenshots illustrating portions of the model visualization interface provided by the model visualization module, according to one embodiment.
Figure 3B:
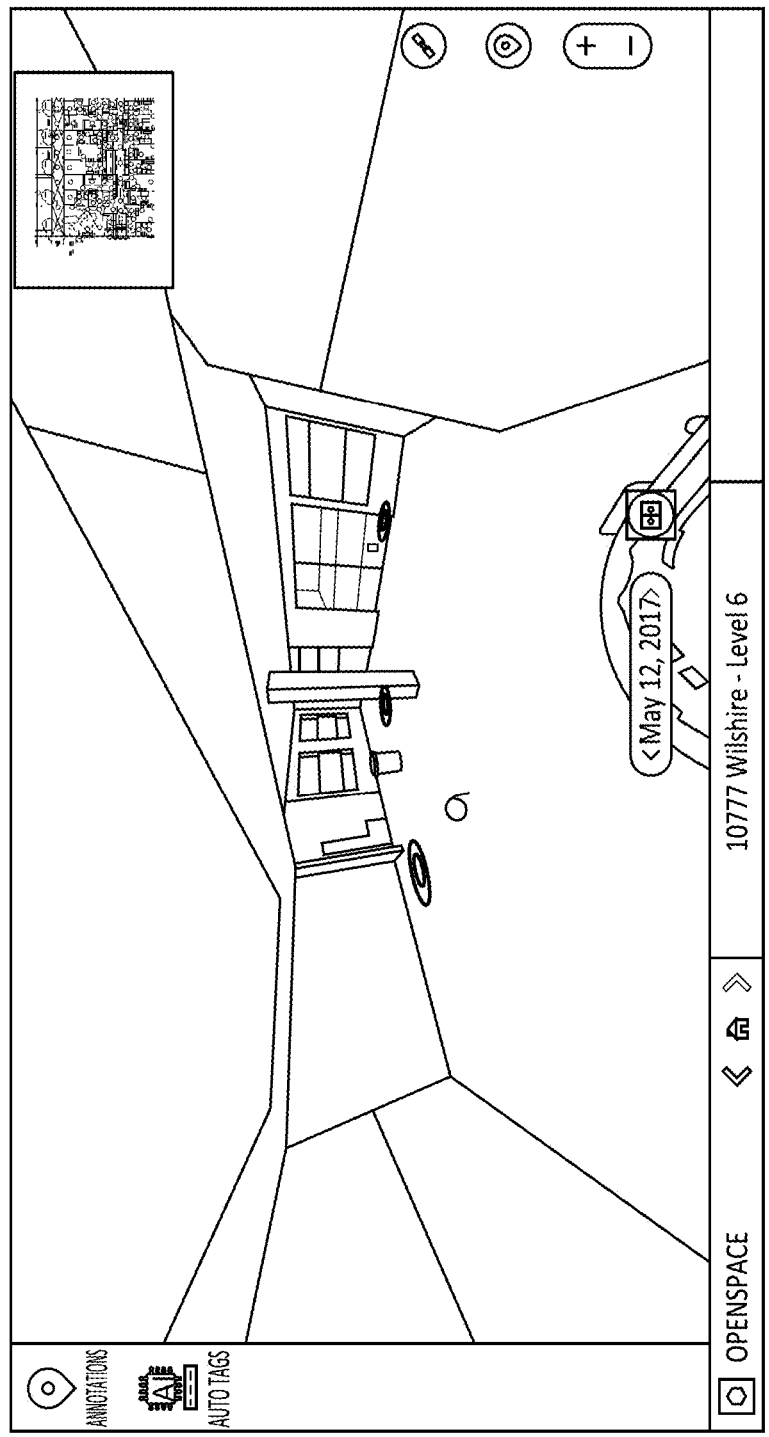

The first-person view also includes waypoint icons representing the positions of other captured frames, and the user can navigate to the first-person view of one of these other frames by selecting the waypoint icon for the frame. As described above with respect to FIG. 2B, each waypoint icon is rendered based on a route vector that points from the frame being displayed to the other frame. An example of the 2D overhead view map is shown in FIG. 3A, and an example of a first-person view is shown in FIG. 3B. In the first-person view shown in FIG. 3B, the waypoint icons are blue circles.

Figure 3C:
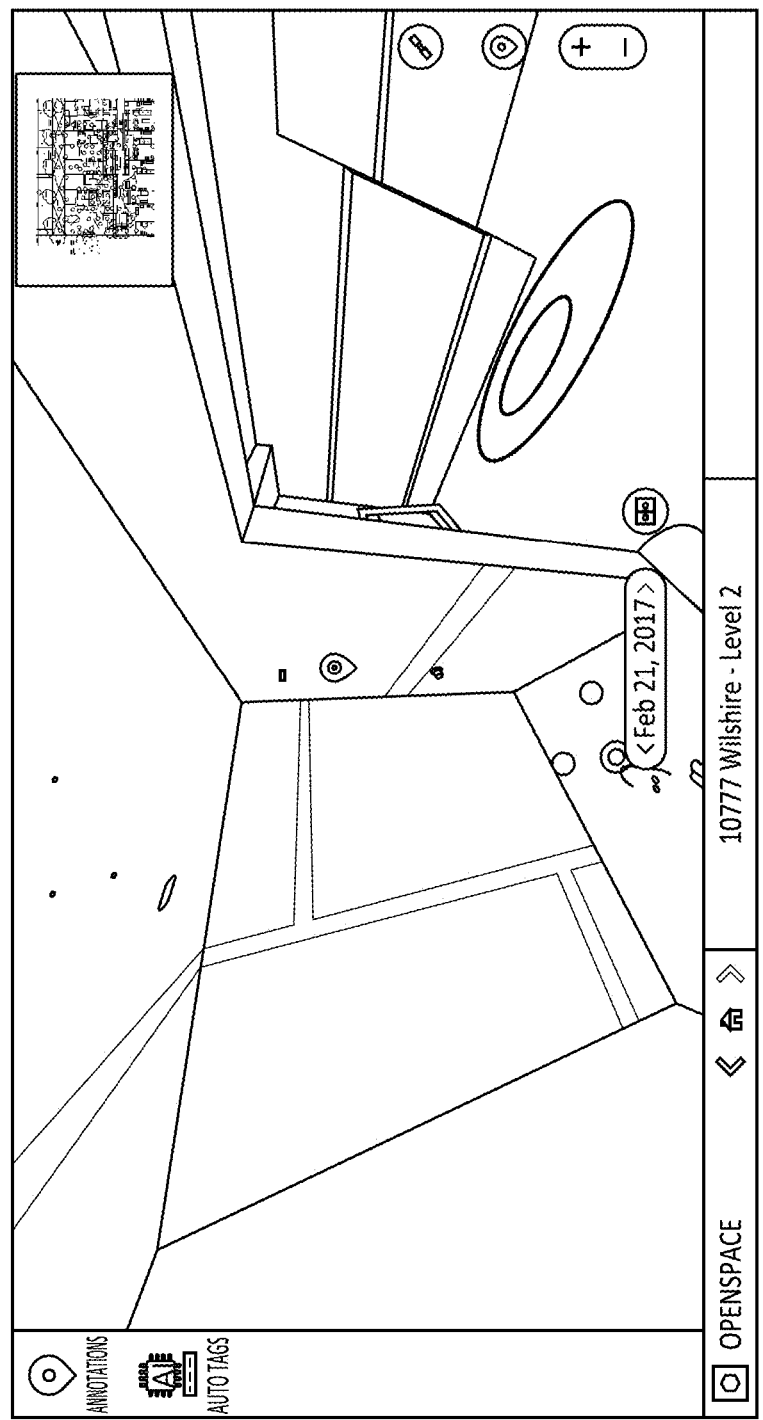

Referring back to the general contracting company example, two months after the frames are recorded, a problem is discovered in one of the units that requires the examination of electrical work that is hidden inside one of the walls. Traditionally, examining this electrical work would require tearing down the drywall and other completed finishes in order to expose the work, which is a very costly exercise. However, the general contractor is instead able to access the visualization interface and use the 2D overhead map view to identify the location within the building where the problem was discovered. The general contractor can then click on that location to view an frame taken at that location. In this example, the frame shown in FIG. 3C is taken at the location where the problem was discovered.

In one embodiment, the visualization interface also includes a split-screen view that displays a first frame on one side of the screen and a second frame on the other side of the screen. This can be used, for example, to create a side-by-side view of two frames that were captured at the same location at different times. These two views can also be synchronized so that adjusting the zoom/orientation in one view adjusts the zoom/orientation in the other view.

Figure 3D:
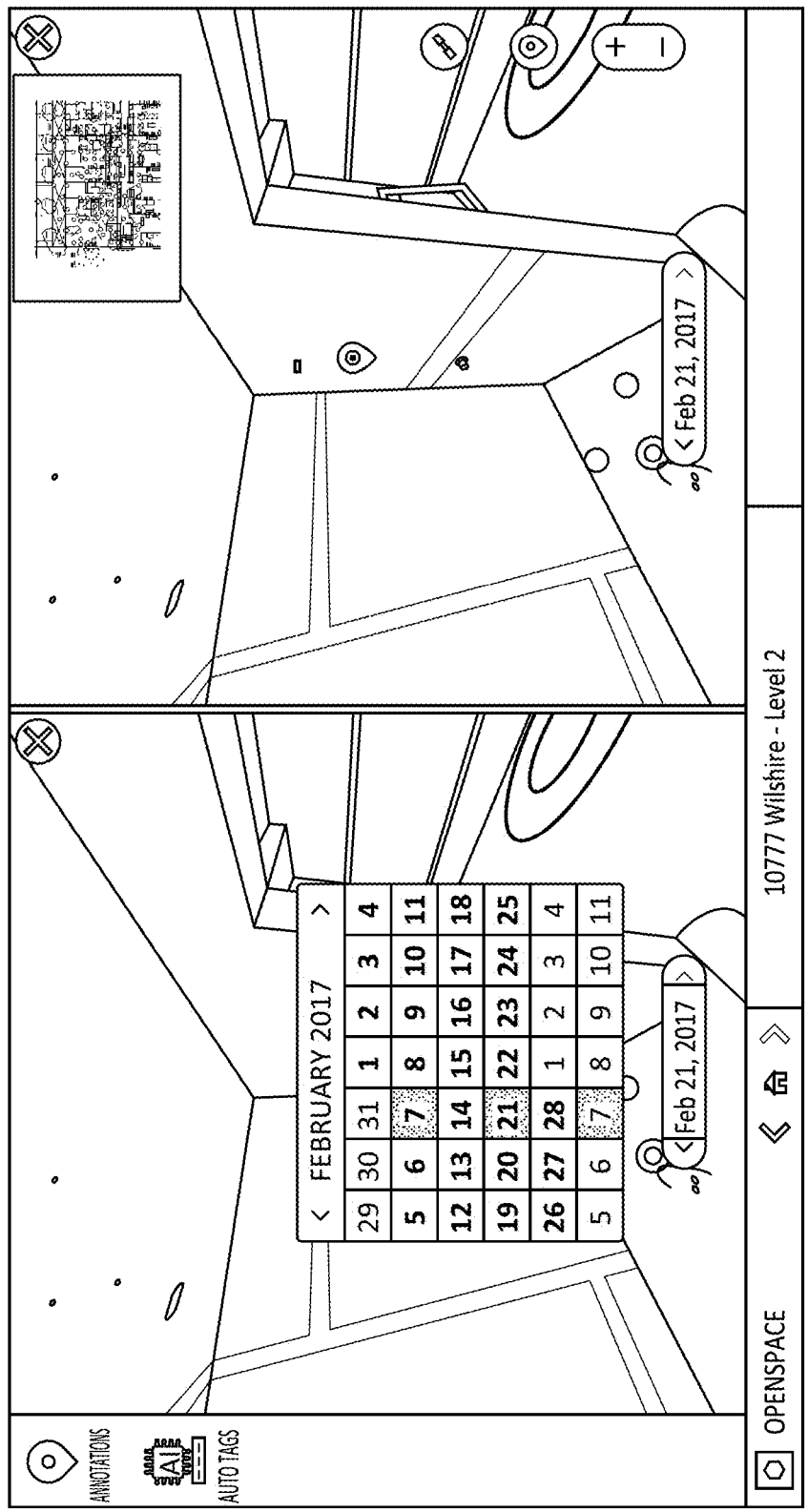
Figure 3E:
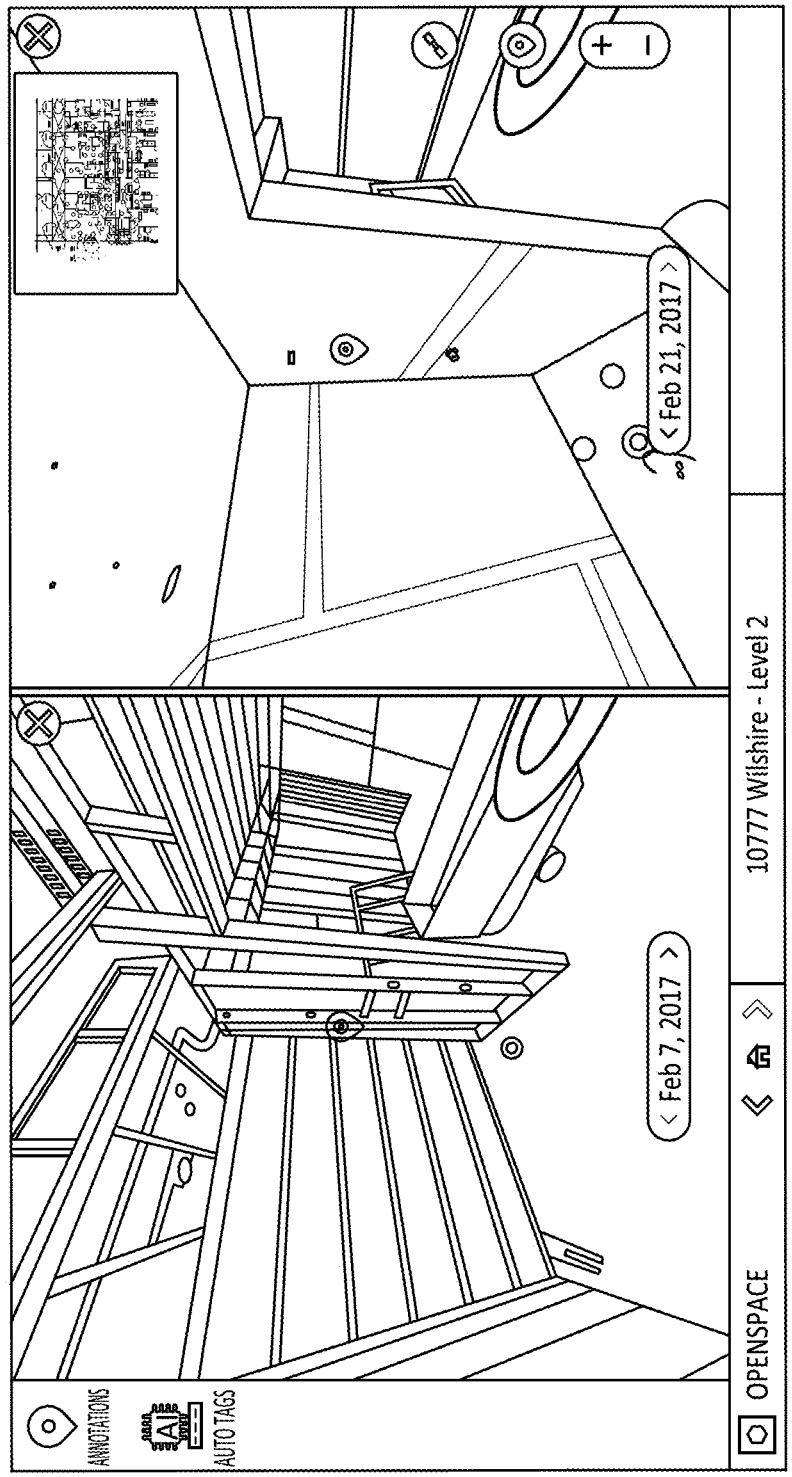

In the screenshots shown in FIGS. 3D and 3E, the general contractor has used the split-screen view to create a side-by-side view that displays an frame from a day after drywall was installed on the right side and an frame taken from an earlier date (e.g. the day before drywall was installed) on the left side. By using the visualization interface to "travel back in time" and view the electrical work before it was covered with the drywall, the general contractor can inspect the electrical issues while avoiding the need for costly removal of the drywall. Furthermore, because the spatial indexing system 130 can automatically index the location of every captured frame without having a user perform any manual annotation, the process of capturing and indexing the frames is less time consuming and can be performed on a regular basis, such as every day or several times per week.

Figure 3F:
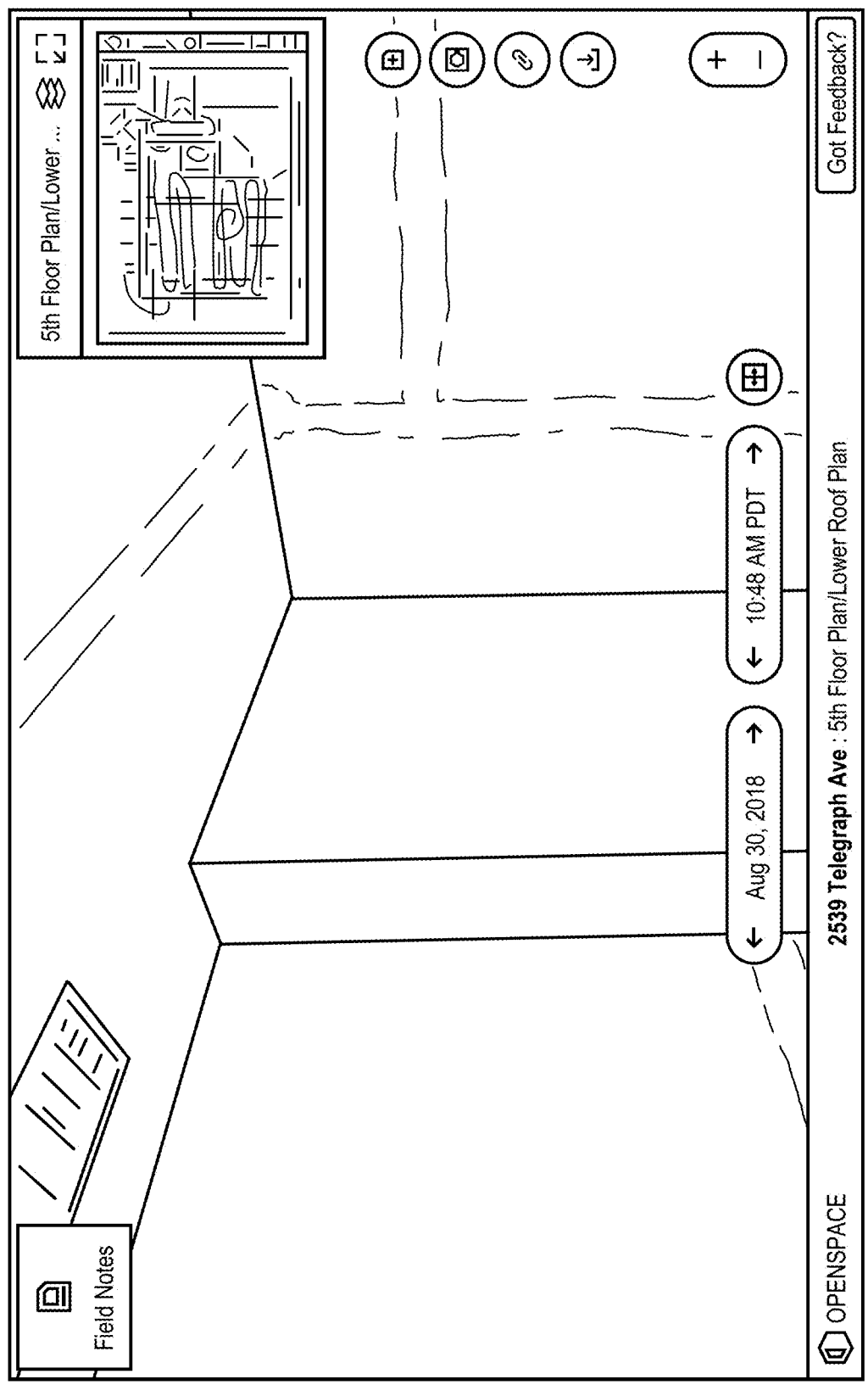
Figure 3G:
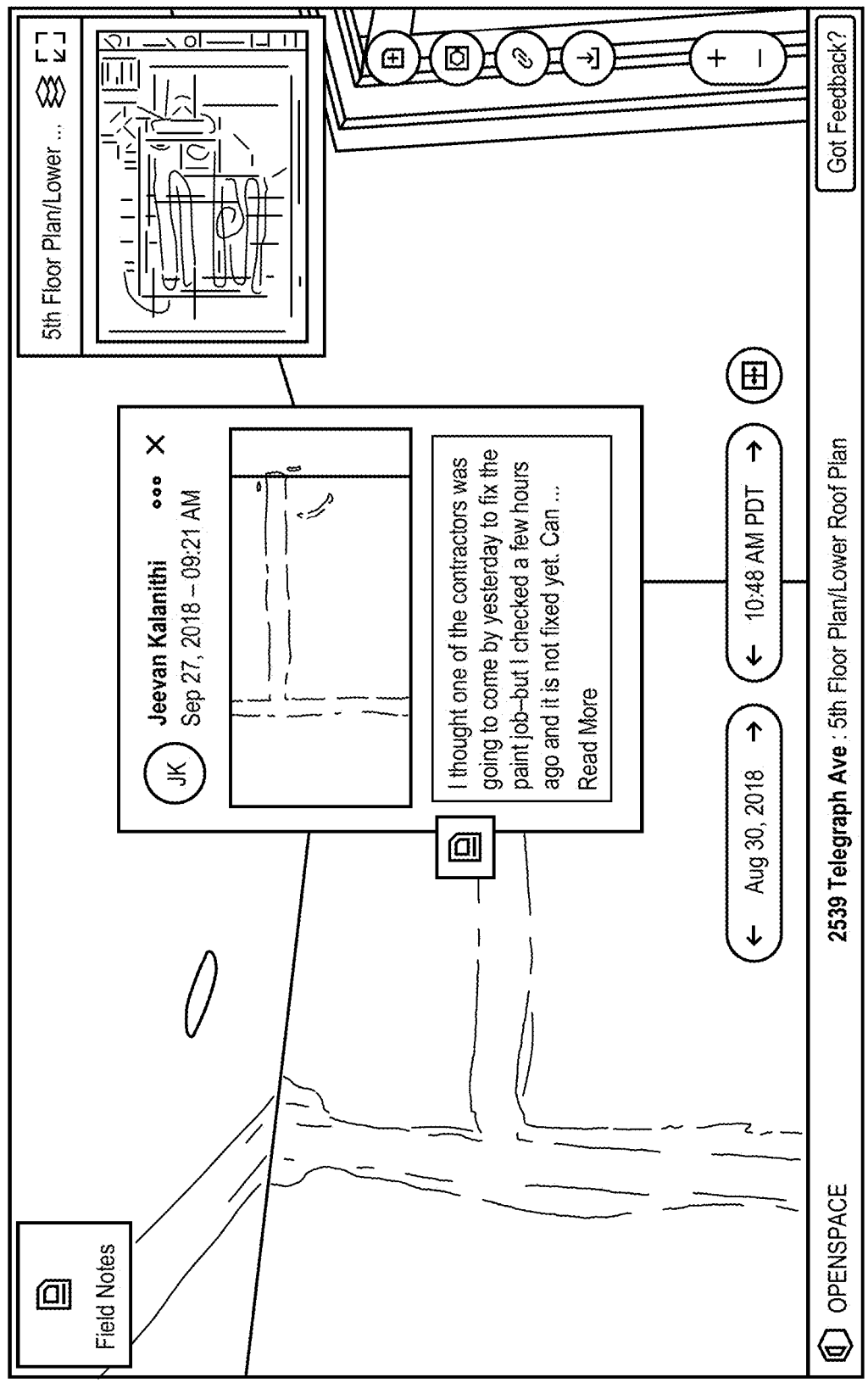

The screenshots in FIGS. 3F-3G show an extension of this example that includes a field note. At the top left of the screenshot in FIG. 3F is the option to select field notes. While the system is capturing the frames, the general contractor may notice something noteworthy in the construction site such as wiring a wall with an unfinished paint job that needs fixing and wants to capture a more detailed image of the wall. If the general contractor makes a written note or other observation that is not synchronized with the system, the note may be lost or difficult to access when needed. Instead, the general contractor can make a field note in the system by capturing a 2D image of the issue and allowing the spatial indexing system 130 to automatically insert a field note in the model, as shown in FIG. 3G. Comments can be added to the field note, such as the comment shown in FIG. 3G. The field note is automatically indexed by the spatial indexing system 130 into its location in the visualization model of the construction site. Any user able to view the model on a client device 150 can then also view the field note in its proper location and any associated images or comments within the field note in an interface like the one shown in FIG. 3G.

Further aspects of commenting on field notes are also envisioned. The spatial indexing system 130 permits users to author comments that are either associated with images directly, or they may author comments that follow off of existing comments of the field notes. This chain hierarchy allows conversation threads to be created off of a root comment associated with a field note image. Any further comment may chain off of any previous comment or the image, meaning that potentially large numbers of comment chains may arise from a given field note.

Comments may further include identification of the user of the system 130 who authored a comment. Comments themselves may include special characters or computer code that allow referencing to users or other comments in an interactive fashion, so that comments identify users listed in comments. Further special characters or code may be included such as hashtags, graphical elements and so on. The visualization interface/immersive model also include graphical user interface elements to visually distinguish these elements and provide interactivity with them, so that users can interact, through an associated computing device, via clicks or touch interactions, to see information about users of the system, transition graphically between comments, move to other parts of the camera path or model, transition between views (e.g., $1^{st}$ person camera path, $3^{rd}$ person model view), and so on.

Comment threads off of field notes may also be visually displayed in a GUI separately from their associated frames or the immersive model. They may also be aggregated together for export into a report or document, which may be converted into a document format and saved to disk or exchanged via email. These reports may also include the field note images themselves, an example of the camera path from a $3^{rd}$ person point of view, and any other information described herein.

VIII. Spatial Indexing of Frames Based on Floorplan Features

As noted above, the visualization interface can provide a 2D overhead view map that displays the location of each frame within a floorplan of the environment. In addition to being displayed in the overhead view, the floorplan of the environment can also be used as part of the spatial indexing process that determines the location of each frame.

Figure 4:
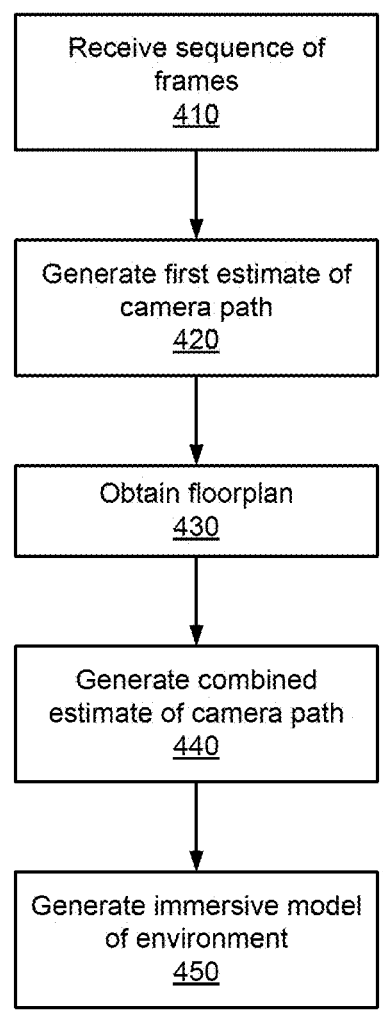
FIG. 4 is a flow chart illustrating an example method for automated spatial indexing of frames using features in a floorplan, according to one embodiment.

FIG. 4 is a flow chart illustrating an example method 400 for automated spatial indexing of frames using features in a floorplan, according to one embodiment. In other embodiments, the method 400 may include additional, fewer, or different steps, and the steps shown in FIG. 4 may be performed in a different order. For instance, the method 400 may be performed without obtaining 430 a floorplan, in which case the combined estimate of the camera path is generated 440 without using features in the floorplan.

The spatial indexing system 130 receives 410 a video that is a sequence of frames from a video capture system 110. The frames in the sequence are captured as the video capture system 110 is moved through an environment (e.g., a floor of a construction site) along a camera path. In one embodiment, each of the frames is a 360-degree frame that is captured by a 360-degree camera on the video capture system (e.g., the 360-degree camera 112 described above with respect to FIG. 1A). In another embodiment, each of the frames has a narrower field of view, such as 90 degrees.

The spatial indexing system 130 generates 420 a first estimate of the camera path based on the video that is a sequence of frames. The first estimate of the camera path can be represented, for example, as a six-dimensional vector that specifies a 6D camera pose for each frame in the sequence. In one embodiment, a component of the spatial indexing system 130 (e.g., the SLAM module 216 described above with reference to FIG. 2A) performs a SLAM algorithm on the video that is a sequence of frames to simultaneously determine a 6D camera pose for each frame and generate a three-dimensional virtual model of the environment.

The spatial indexing system 130 obtains 430 a floorplan of the environment. For example, multiple floorplans (including the floorplan for the environment that is depicted in the received video that is a sequence of frames) may be stored in the floorplan storage 136, and the spatial indexing system 130 accesses the floorplan storage 136 to obtain the floorplan of the environment. The floorplan of the environment may also be received from a user via the video capture system 110 or a client device 150 without being stored in the floorplan storage 136.

The spatial indexing system 130 generates 440 a combined estimate of the camera path based on the first estimate of the camera path and the physical features in the floorplan. Two example methods 500, 600 of generating the combined estimate of the camera path 440 are described below with respect to FIGS. 5 and 6, respectively.

After generating 440 the combined estimate of the camera path, the spatial indexing system 130 generates 450 an immersive model of the environment. For example, the model generation module 138 generates the immersive model by combining the floorplan, a plurality of route vectors, the combined estimate of the camera path, and extracted frames from the video that is a sequence of frames, as described above with respect to FIG. 2B.

In some embodiments, the spatial indexing system 130 may also receive additional data (apart from the video that is a sequence of frames) that was captured while the video capture system is being moved along the camera path. For example, the spatial indexing system also receives motion data or location data as described above with reference to FIG. 1A. In embodiments where the spatial indexing system 130 receives additional data, the spatial indexing system 130 may use the additional data in addition with the floorplan when generating 440 the combined estimate of the camera path.

In an embodiment where the spatial indexing system 130 receives motion data along with the video that is a sequence of frames, the spatial indexing system 130 can perform a dead reckoning process on the motion data to generate a second estimate of the camera path, as described above with respect to FIG. 2A. In this embodiment, the step of generating 440 the combined estimate of the camera path includes using portions of the second estimate to fill in gaps in the first estimate of the camera path. For example, the first estimate of the camera path may be divided into camera path segments due to poor feature quality in some of the captured frames (which causes gaps where the SLAM algorithm cannot generate a reliable 6D pose, as described above with respect to FIG. 2A). In this case, 6D poses from the second path estimate can be used to join the segments of the first path estimate by filling in the gaps between the segments of the first path estimate.

As noted above, in some embodiments the method 400 may be performed without obtaining 430 a floorplan and the combined estimate of the camera path is generated 440 without using features in the floorplan. In one of these embodiments, the first estimate of the camera path is used as the combined estimate of the camera path without any additional data processing or analysis.

In another one of these embodiments, the combined estimate of the camera path is generated 440 by generating one or more additional estimates of the camera path, calculating a confidence score for each 6D pose in each path estimate, and selecting, for each spatial position along the camera path, the 6D pose with the highest confidence score. For instance, the additional estimates of the camera path may include one or more of: a second estimate using motion data, as described above, a third estimate using data from a GPS receiver, and a fourth estimate using data from an IPS receiver. As described above, each estimate of the camera path is a vector of 6D poses that describe the relative position and orientation for each frame in the sequence.

The confidence scores for the 6D poses are calculated differently for each path estimate. For instance, confidence scores for the path estimates described above may be calculated in the following ways: a confidence score for a 6D pose in the first estimate (generated with a SLAM algorithm) represents the feature quality of the frame corresponding to the 6D pose (e.g., the number of detected features in the frame); a confidence score for a 6D pose in the second estimate (generated with motion data) represents a level of noise in the accelerometer, gyroscope, and/or magnetometer data in a time interval centered on, preceding, or subsequent to the time of the 6D pose; a confidence score for a 6D pose in the third estimate (generated with GPS data) represents GPS signal strength for the GPS data used to generate the 6D pose; and a confidence score for a 6D pose in the fourth estimate (generated with IPS data) represents IPS signal strength for the IPS data used to generate the 6D pose (e.g., RF signal strength).

After generating the confidence scores, the spatial indexing system 130 iteratively scans through each estimate of the camera path and selects, for each frame in the sequence, the 6D pose having the highest confidence score, and the selected 6D pose is output as the 6D pose for the frame in the combined estimate of the camera path. Because the confidence scores for each path estimate are calculated differently, the confidence scores for each path estimate can be normalized to a common scale (e.g., a scalar value between 0 and 1, with 0 representing the lowest possible confidence and 1 representing the highest possible confidence) before the iterative scanning process takes place.

IX. Camera Path Generation—Floor Plan Alignment with Brute Force Search

Figure 5:
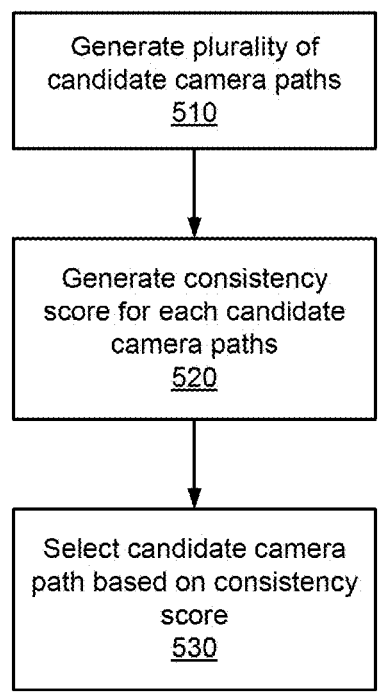
FIG. 5 is a flow chart illustrating an example method for aligning a camera path with a floorplan using a brute force search, according to one embodiment.

FIG. 5 is a flow chart illustrating a method 500 for generating a combined camera path with a floorplan using a brute force search, according to one embodiment. In other embodiments, the method 500 may include additional, fewer, or different steps, and the steps shown in FIG. 5 may be performed in a different order.

The brute force search described in FIG. 5 aligns an estimate of the camera path with a floorplan by generating multiple candidate camera paths (e.g., by applying different scaling, rotation, and translation operations on the camera path estimate) and selecting the candidate camera path that has the highest consistency score relative to the features on the floorplan. As noted above, in some embodiments the first estimate of the camera path can be divided into a plurality of camera path segments (e.g., due to poor feature quality in some of the captured frames). In these embodiments, the brute force search can be performed separately for each of the camera path segments to align each camera path segment with the floorplan. After aligning each of the camera path segments with the floorplan, the spatial indexing system can then use other data, such as motion data, to fill in the gaps in the camera path between the aligned camera path segments. The combination of the aligned camera paths and the filled-in gaps is then output as the combined camera path.

For ease of description, the brute force search is described below with respect to a camera path segment. However, the brute force search can also performed on the entirety of the first path estimate. For example, in some embodiments the first estimate of the camera path is not divided into segments (e.g., because each frame in the sequence of 360-degree frames includes features of sufficiently high quality). In these embodiments, the brute force search described in FIG. 5 is performed on the entirety of the first path estimate to align the first path estimate with the floorplan. In these embodiments, the result of the brute force search is output as the combined path estimate.

Referring now to FIG. 5, the spatial indexing system 130 generates 510 a plurality of candidate camera paths by applying a variety of transformations such as scaling, rotation, and translation operations to the camera path segment.

The spatial indexing system 130 compares each candidate camera path to the features in the floorplan and generates a consistency score for each of the candidate camera paths. The consistency score for a candidate camera path represents the degree of consistency between the candidate camera path and the floorplan.

In one embodiment, the consistency score is a weighted sum of four components. The first component represents the level of similarity between the candidate camera path and the features in the floorplan. For example, the first component can be calculated by generating an intersect score for each instance the candidate camera path intersects a feature in the floorplan, and then combining the intersect scores (e.g., by adding them together). The intersect score represents the likelihood of the real-world camera path passing through the type of feature being intersected (e.g., a high intersect score is generated for intersecting a door, while a low intersect score is generated for intersecting a wall).

The second and third components are based on location data received from the video capture system 110. The second component represents a degree of consistency between the candidate camera path and data from a GPS receiver on the video capture system. For instance, the second component is calculated by combining the distances between a location implied by the candidate camera path and a location specified by the location data at the same point in time. Meanwhile, the third component represents a degree of similarity between the candidate camera path and data from an IPS receiver on the video capture system 110. The third component can be computed in the same manner as the second component. In embodiments where the spatial indexing system 130 does not receive location data from the video capture system 110 (or only receives one type of location data), one or both of these components can be omitted from the consistency score.

The fourth component is generated by comparing features in the captured video that is a sequence of frames with features from frames that were previously captured at the same location on the floorplan. In an embodiment where the consistency score includes the fourth component, the spatial indexing system 130 stores previously-captured frames in association with their floorplan locations (e.g., as part of one of the models in the model storage 140).

After generating the consistency scores for the candidate camera paths, the spatial indexing system 530 selects one candidate camera path based on the consistency scores. For example, the spatial indexing system 530 selects the candidate camera path with the highest consistency score.

X. Camera Path Generation—Floor Plan Alignment with Grid Map

Figure 6A:
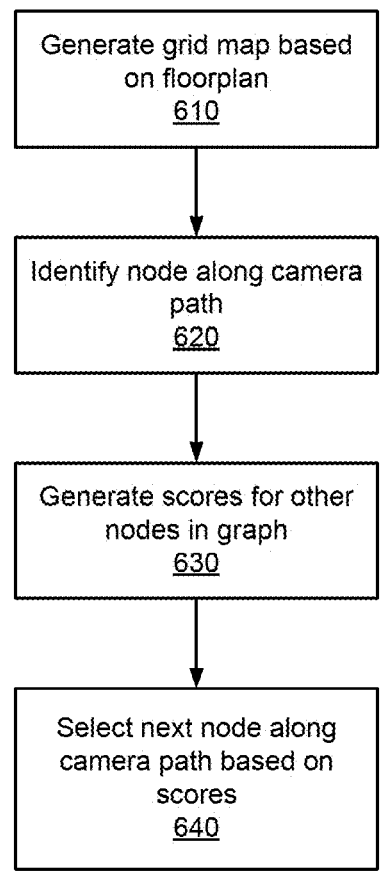
FIG. 6A is a flow chart illustrating an example method for aligning a camera path with a floorplan using a grid map of a floorplan, according to one embodiment.

FIG. 6A is a flow chart illustrating an example method 600 for generating a combined camera path using a grid map of a floorplan, according to one embodiment. In other embodiments, the method 600 may include additional, fewer, or different steps, and the steps shown in FIG. 6A may be performed in a different order.

The spatial indexing system 130 generates 610 a grid map based on the floorplan. The grid map is a graph in which each node represents a spatial position on the floorplan, and each edge between two nodes specifies a transition score that represents the traversability of the space between the two nodes. The transition score for an edge is determined based on the presence of features between the two nodes. For example, if a wall is present between the two nodes, then the transition score for the edges between those two nodes is lower to indicate that the camera path is unlikely to cross between the two nodes. In contrast, if a door is present between two nodes, then the transition score for the edge between the two nodes is higher.

In one embodiment, the weights for edges that pass through walls are adjusted over time. For example, at a first time (e.g., at an early stage in construction when the framing for the walls is not yet in place), the weights for these edges are assigned the same value as the weights for edges that pass through empty space inside a room. At a second time (e.g., at an intermediate stage in construction when the framing has been constructed, but the drywall is not yet in place), the weights for these edges are assigned a reduced value to indicate that physically passing through the wall is possible but not common. At a third time (e.g., at a later stage in construction when both the framing and the drywall are in place), the weights for these edges are assigned a low value to indicate that passing through the wall is physically impossible. The times corresponding to the first time, the second time, and the third time may be received as user input from a client device 150, determined based on a construction schedule provided to the spatial indexing system 130, or by performing feature recognition on some or all of the frames in the sequence to determine the construction progress on the walls.

In one embodiment, the presence of a floorplan feature (such as a wall or a door) between two nodes is detected using a computer vision feature classifier. In this embodiment, the feature classifier extracts frame features (e.g., SIFT SURG, or ORB features) from a frame of the floorplan and uses the frame features to classify different features (e.g., walls and doors) that appear at various positions in the floorplan. The feature classifier can be trained, for example, using training data that includes a plurality of manually annotated floorplans. In other embodiments, the presence of a feature between two nodes can be detected manually (e.g., by user input) or by using metadata within the floorplan.

Figure 6B:
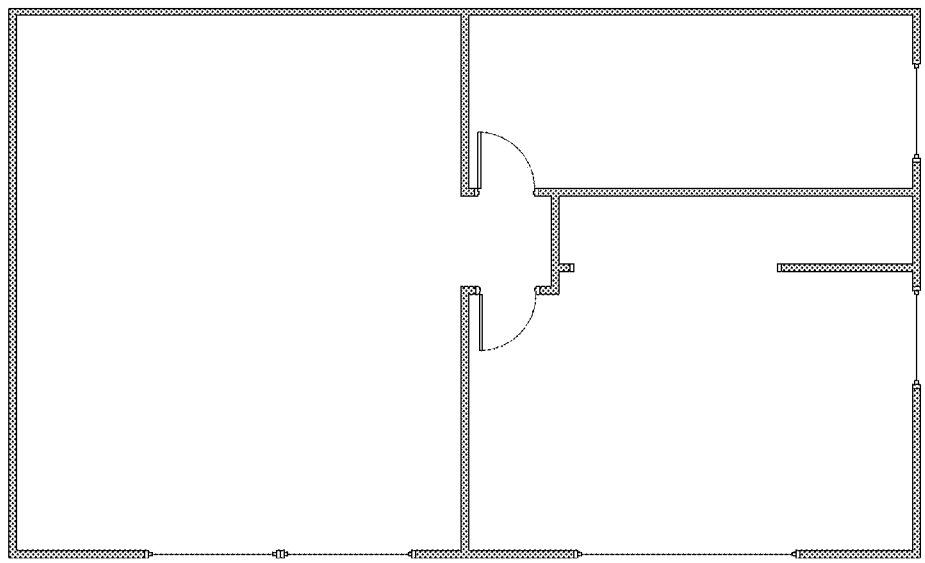
FIG. 6B illustrates an example of a floorplan, according to one embodiment.
Figure 6C:
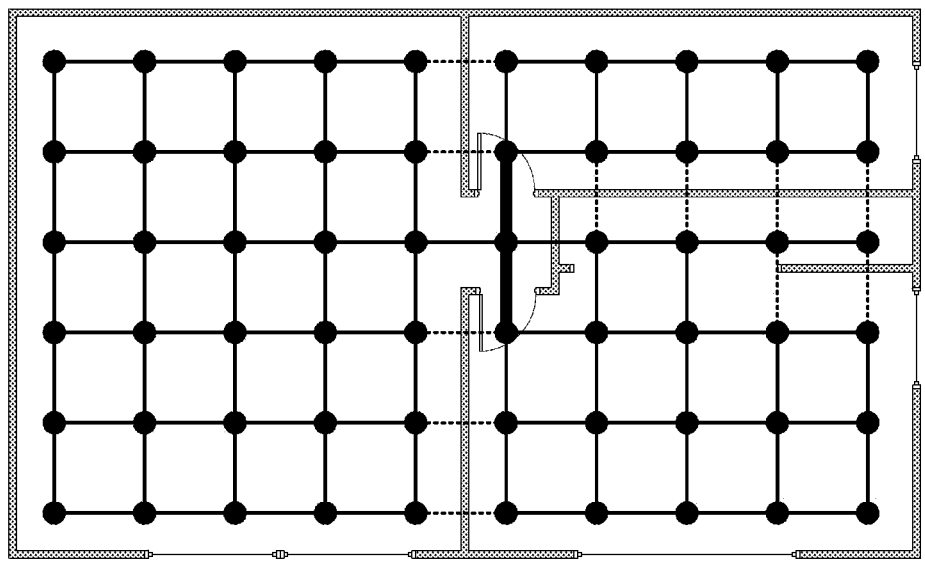
FIG. 6C illustrates an example of a grip map, according to one embodiment.

FIG. 6B illustrates an example of a floorplan, and FIG. 6C illustrates an example of a grip map that is generated for the floorplan. In the example grid map shown in FIG. 6C, the nodes are equally spaced in both the horizontal and vertical directions so that the nodes and edges for a two-dimensional grid of squares. Edges having a lower transition score are illustrated in FIG. 6C with dotted lines, and edges having a higher transition score are illustrated with thicker lines. As shown in FIG. 6C, the edges that cross the walls have a lower transition score, while the edges that pass through the two doors have a higher transition score.

After generating 610 the grid map, the spatial indexing system 130 performs an iterative Map Matching algorithm to match the first estimate of the camera path to the grid map. The Map Matching algorithm can be, for example, a Hidden Markov Model (HMM), a conditional random field (CRF), or some other type of Map Matching algorithm.

In the embodiment shown in FIG. 6A, the spatial indexing system 130 performs Map Matching by performing a Markov process to iteratively identify nodes along a path through the grid map that match the first estimate of the camera path.

An iteration of the Markov process begins by identifying 620 one node along the camera path. When the process is initiated, the first node that is identified is the starting point of the camera path. The starting point may be provided as user input or determined based on location data (e.g., GPS or IPS data) received from the video capture system 110.

Once a node has been identified, the spatial indexing system 130 generates 630 scores for a plurality of the other nodes in the grid map. In one embodiment, the spatial indexing system 130 scores every other node in the graph apart from the identified node. In other embodiments, the spatial indexing system 130 scores a subset of the other nodes in the graph. For example, the spatial indexing system 130 scores each node that is separated from the identified node by less than a threshold number of edges (i.e., the spatial indexing system 130 scores the nodes that are close to the identified node). This may be useful, for example, when the grid map includes a large number of nodes and edges and it would be too computationally intensive to score each of the other nodes.

The scores are generated 630 based on the transition scores for the edges between the identified node and the other node. The score is further based on the direction of the first estimate of the camera path near the identified node. For instance, if the first estimate of the camera path travels to the left near the identified node, then a higher score is generated for the edge connecting the identified node to the adjacent node on its left, while lower scores are generated for the edges connecting the identified node to the adjacent nodes above, below, and to the right. The score is also based on the distance traveled by the first estimate of the camera path near the identified node. For example, if the next 6D pose vector on the camera path is 4 feet away, and adjacent nodes in the grid map are separate by a distance of 2 feet, then nodes that are separated from the identified node by two edges are assigned a higher score.

The spatial indexing system 130 uses the scores for each of the other nodes to select 640 one of other nodes as the next nodes along the camera path. The selected node is designated as the new identified node, and the steps of generating scores 630 for other nodes and selecting 640 the next node in the camera path are repeated until nodes along the entire camera path have been identified. The spatial indexing system 130 can then perform a Viterbi algorithm to identify the most likely path through the grid map based on the identified nodes. The identified path can then be provided as the output of the step of generating 440 the combined estimate of the camera path.

XI. Visualization Interface—Field Note Examples

Figure 7A:
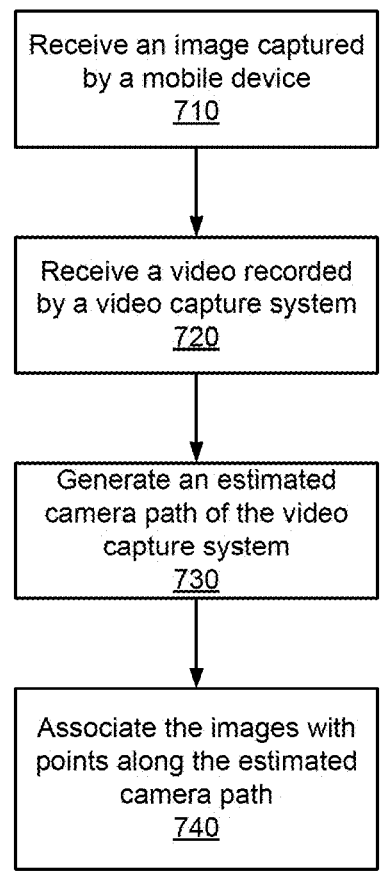
FIG. 7A is a flow chart illustrating an example method for adding a field note to an immersive model, according to one embodiment.

FIG. 7A is a flow chart illustrating an example method 700 for adding a field note to an immersive model, according to one embodiment. In other embodiments, the method 700 may include additional, fewer, or different steps, and the steps shown in FIG. 7A may be performed in a different order.

The spatial indexing system 130 receives 710 an image captured by a mobile device. In some embodiments, the spatial indexing system 130 receives 710 a plurality of images, either at once or in succession, as described in relation to FIG. 1B. In some embodiments, the spatial indexing system 130 receives 710 data associated with the image, such as timestamp data or other data associated with the capture of the image. The mobile device may be the client device 150 with an associated mobile camera 152 discussed in relation to FIG. 1A. The image may be received 710 by the spatial indexing system 130 via the network 120.

The spatial indexing system 130 receives 720 a video recorded by a video capture system. In some embodiments, the video includes a sequence of 360-degree frames. In some embodiments, the 360-degree frames are associated with timestamp data, metadata, and/or motion data relating to the capture of the 360-degree frames. The video capture system may be the video capture system 110 of FIG. 1A. The video may be received 720 by the spatial indexing system 130 via the network 120.

The spatial indexing system 130 generates 730 an estimated camera path of the video capture system. In some embodiments, the camera path module 132 of the spatial indexing system 130 generates 730 the estimate of the camera path. The camera path may be generated by the camera path module 132 as described in relation to FIG. 2A. Further, the camera path generated 730 may be used to generate an immersive model, such as by the model generation module 138 of the spatial indexing system 130, as discussed in relation to FIG. 2B.

The spatial indexing system 130 associates 740 the images with points (or locations) along the estimated camera path. The images may be associated 740 with points along the estimated camera path as described in relation to FIG. 2C. Further the camera path generated 730 and images associated 740 may be used in an immersive model, as described in relation to FIGS. 2B and 2C.

Figure 7B:
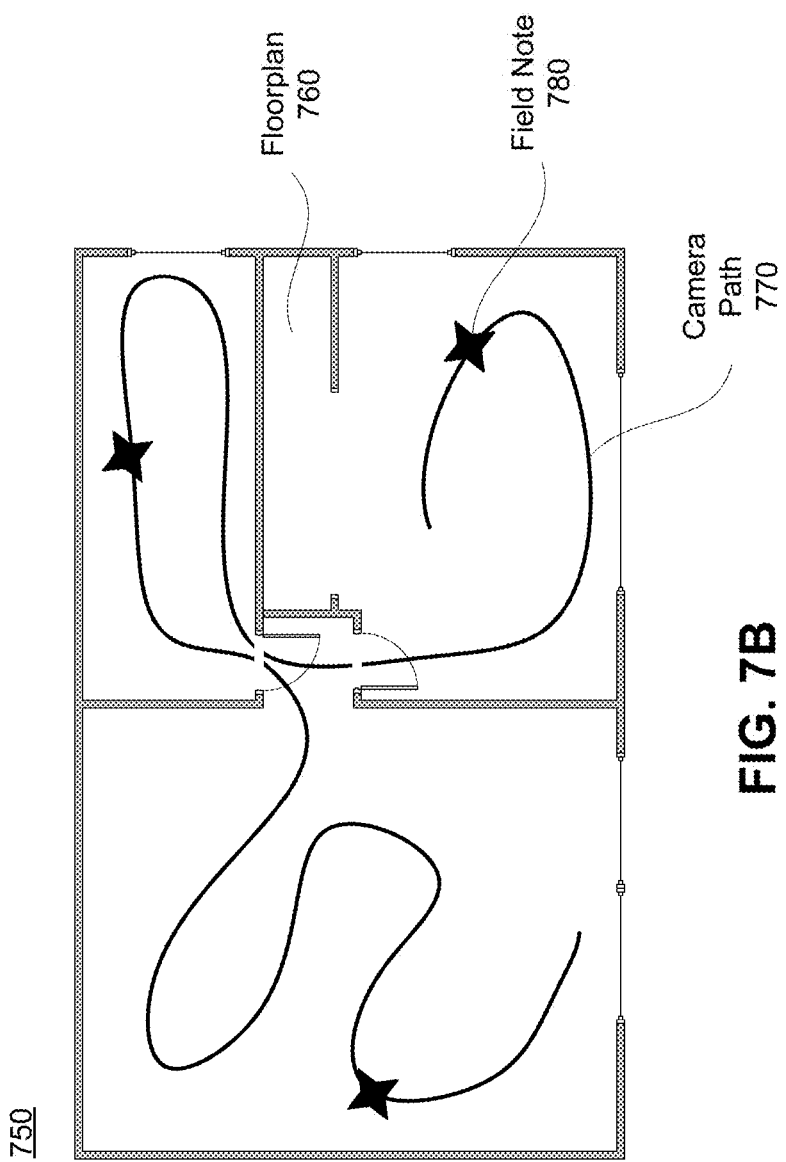
FIG. 7B illustrates an example of a visualization interface displayed on a computing device illustrating a floorplan, camera path, and field notes, according to one embodiment.

FIG. 7B shows a visualization interface 750 including a floorplan 760, a camera path 770, and a set of field notes 780, according to one embodiment. The camera path 770 is visualized as by a line representing the motion of a video capture system (e.g., the video capture system 110) as it moves through the rooms represented by the floorplan 760. The field notes 780 are visualized by four-point starts representing locations at which mobile images were taken along the camera path. The visualization 750 including the floorplan 760 and field notes 780 may be displayed to users on client devices, which may be the same as the mobile smartphone device shown in FIGS. 8A-8C or could be another client device. Through the visualization 750 on the client device, the user can navigate through the floorplan 760 and field notes 780. When the user navigates to select one of the field notes 780, the client device displays a visualization of the contents of the field note 780. The visualization of the field note 780 includes the image as well as any comments or other data included in the field note 780. An example visualization of the field note is shown in FIG. 8C.

FIG. 8A-8C are example field note interfaces on client devices, according to one embodiment. FIGS. 8A-8C show the use of the client device 150 in the form of a smartphone, according to one embodiment. The example interfaces on the client device 150 enable the user of the client device 150 to interact with the spatial indexing system 130 in an application running on the client device 150.

FIG. 8A shows an interface 800 provided for display while the video capture system 110 is recording, according to one embodiment. The interface 800 provides for display a running time 805 and a stop button 810 at center. The timestamps assigned to the frames and images captured correspond to the running time 805 at which they were captured. The timestamps on frames and images can have several more places after a decimal than what is shown on the app interface to make timestamp recordings more accurate. At the bottom, there is a field note button 815 for the user to add field notes. To add a field note, the user selects the field note button 815.

FIG. 8B shows an interface 830 provided for display while adding a field note, according to one embodiment. Specifically, the interface 830 is provided for display while the user is capturing an image for inclusion in the field note. The interface 830 shows a view finder 840 of the mobile camera 152. At top, a running time 835 is displayed. At bottom center is an image capture button 845 to capture a mobile image corresponding to the view finder and at bottom left and right are options to turn on flash and switch camera direction, respectively. Once the user captures the mobile image, the option to add a comment and other data will be provided for display. The user can choose to add comments or leave it blank or add comments later. Once the user is satisfied with the image, comments, and other data input, the mobile device 150 will upload the image, timestamp, and other field note data to the spatial indexing system 130.

FIG. 8C shows an interface 860 provided for display of a completed field note, according to one embodiment. At top is the running time 865. At center are annotations of the field note itself, shown with a portion of the mobile image 870, a portion of the comments 875 added by the user, and the timestamp 880 associated with the mobile image 870. When the user selects the field note, it expands in view and shows all information contained in the field note. At bottom is the option for the user to add another field note.

XII. Hardware Components

Figure 9:
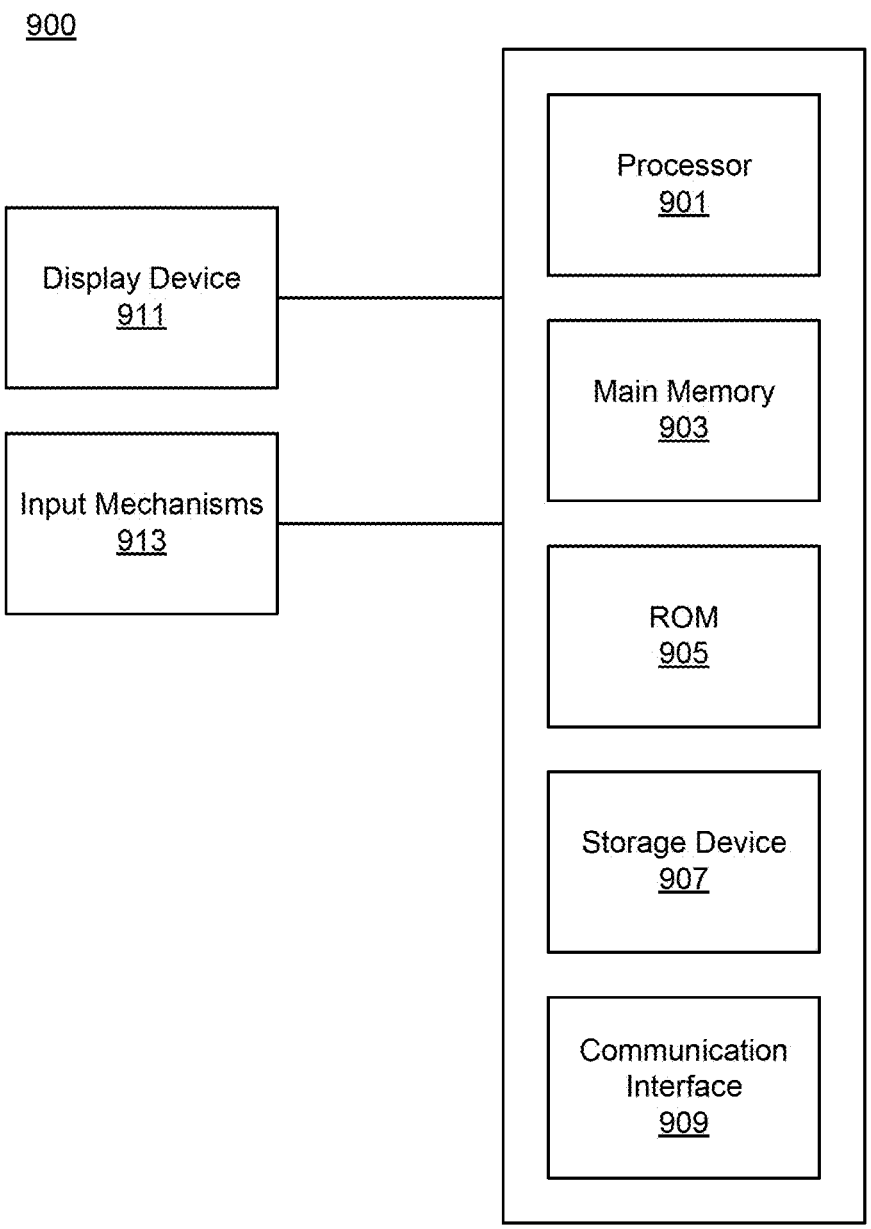
FIG. 9 is a diagram illustrating a computer system that implements the embodiments herein, according to one embodiment.

FIG. 9 is a block diagram illustrating a computer system 900 upon which embodiments described herein may be implemented. For example, in the context of FIG. 1A, the video capture system 110, the spatial indexing system 130, and the client device 150 may be implemented using the computer system 900 as described in FIG. 9. The video capture system 110, the spatial indexing system 130, or the client device 150 may also be implemented using a combination of multiple computer systems 900 as described in FIG. 9. The computer system 900 may be, for example, a laptop computer, a desktop computer, a tablet computer, or a smartphone.

In one implementation, the system 900 includes processing resources 901, main memory 903, read only memory (ROM) 905, storage device 907, and a communication interface 909. The system 900 includes at least one processor 901 for processing information and a main memory 903, such as a random access memory (RAM) or other dynamic storage device, for storing information and instructions to be executed by the processor 901. Main memory 903 also may be used for storing temporary variables or other intermediate information during execution of instructions to be executed by processor 901. The system 900 may also include ROM 905 or other static storage device for storing static information and instructions for processor 901. The storage device 907, such as a magnetic disk or optical disk, is provided for storing information and instructions.

The communication interface 909 can enable system 900 to communicate with one or more networks (e.g., the network 140) through use of the network link (wireless or wireline). Using the network link, the system 900 can communicate with one or more computing devices, and one or more servers. The system 900 can also include a display device 911, such as a cathode ray tube (CRT), an LCD monitor, or a television set, for example, for displaying graphics and information to a user. An input mechanism 913, such as a keyboard that includes alphanumeric keys and other keys, can be coupled to the system 900 for communicating information and command selections to processor 901. Other non-limiting, illustrative examples of input mechanisms 913 include a mouse, a trackball, touch-sensitive screen, or cursor direction keys for communicating direction information and command selections to processor 901 and for controlling cursor movement on display device 911. Additional examples of input mechanisms 913 include a radio-frequency identification (RFID) reader, a barcode reader, a three-dimensional scanner, and a three-dimensional camera.

According to one embodiment, the techniques described herein are performed by the system 900 in response to processor 901 executing one or more sequences of one or more instructions contained in main memory 903. Such instructions may be read into main memory 903 from another machine-readable medium, such as storage device 907. Execution of the sequences of instructions contained in main memory 903 causes processor 901 to perform the process steps described herein. In alternative implementations, hard-wired circuitry may be used in place of or in combination with software instructions to implement examples described herein. Thus, the examples described are not limited to any specific combination of hardware circuitry and software.

XIII. Additional Considerations

As used herein, the term "includes" followed by one or more elements does not exclude the presence of one or more additional elements. The term "or" should be construed as a non-exclusive "or" (e.g., "A or B" may refer to "A," "B," or "A and B") rather than an exclusive "or." The articles "a" or "an" refer to one or more instances of the following element unless a single instance is clearly specified.

The drawings and written description describe example embodiments of the present disclosure and should not be construed as enumerating essential features of the present disclosure. The scope of the invention should be construed from any claims issuing in a patent containing this description.

What is claimed is:

1. A method comprising:
generating and displaying a three-dimensional rendering of an environment based at least in part on video captured by an image capture system as the image capture system moves through the environment;
determining a location associated with a content annotation created within the environment based on a comparison of a first timestamp captured by a content annotation system that creates the content annotation to a second timestamp captured by the image capture system; and
modifying the displayed three-dimensional rendering of the environment to include the content annotation at the location within the three-dimensional rendering of the environment.

2. The method of claim 1, wherein the content annotation comprises metadata describing one or more of the location at which the content annotation was created, a time at which the content annotation was created, an identity of a user that created the content annotation, and the content annotation system that creates the content annotation.

3. The method of claim 2, wherein the location is determined based on locations described by the metadata.

4. The method of claim 1, wherein the content annotation is created by a user that moves the image capture system through the environment.

5. The method of claim 1, wherein the content annotation comprises text.

6. The method of claim 1, wherein the content annotation comprises a comment associated with an image captured within the environment.

7. The method of claim 1, wherein the content annotation comprises one or more of images, timestamps, camera orientation information, and metadata associated with the content annotation.

8. The method of claim 1, wherein the three-dimensional rendering of the environment is aligned with a floorplan of the environment, and wherein the floorplan specifies positions of a plurality of physical features in the environment that are included within the three-dimensional rendering of the environment.

9. The method of claim 1, wherein the content annotation is associated with a feature of the environment, and wherein a displayed interface is modified to include the content annotation when the feature of the environment is shown within the three-dimensional rendering of the environment.

10. The method of claim 1, wherein the content annotation is generated from a plurality of users, and wherein the content annotation is displayed in a feed such that more than one content annotation is visible at once.

11. A system comprising:
a processor; and
a non-transitory computer readable storage medium comprising computer program instructions that when executed by the processor, cause the processor to:
generating and displaying a three-dimensional rendering of an environment based at least in part on video captured by an image capture system as the image capture system moves through the environment;
determining a location associated with a content annotation created within the environment based on a comparison of a first timestamp captured by a content annotation system that creates the content annotation to a second timestamp captured by the image capture system; and
modifying the displayed three-dimensional rendering of the environment to include the content annotation at the location within the three-dimensional rendering of the environment.

12. The system of claim 11, wherein the content annotation comprises metadata describing one or more of the location at which the content annotation was created, a time at which the content annotation was created, an identity of a user that created the content annotation, and the content annotation system that creates the content annotation.

13. The system of claim 12, wherein the location is determined based on locations described by the metadata.

14. The system of claim 11, wherein the content annotation is created by a user that moves the image capture system through the environment.

15. The system of claim 11, wherein the content annotation comprises text.

16. The system of claim 11, wherein the content annotation comprises a comment associated with an image captured within the environment.

17. The system of claim 11, wherein the content annotation comprises one or more of images, timestamps, camera orientation information, and metadata associated with the content annotation.

18. The system of claim 11, wherein the three-dimensional rendering of the environment is aligned with a floorplan of the environment, and wherein the floorplan specifies positions of a plurality of physical features in the environment that are included within the three-dimensional rendering of the environment.

19. The system of claim 11, wherein the content annotation is associated with a feature of the environment, and wherein a displayed interface is modified to include the content annotation when the feature of the environment is shown within the three-dimensional rendering of the environment.

20. The system of claim 11, wherein the content annotation is generated from a plurality of users, and wherein the content annotation is displayed in a feed such that more than one content annotation is visible at once.

* * * * *